(12) United States Patent
Raslambekov

(10) Patent No.: US 11,055,850 B1
(45) Date of Patent: Jul. 6, 2021

(54) SYSTEMS AND METHODS FOR TOOTH SEGMENTATION

(71) Applicant: Oxilio Ltd, Larnaca (CY)

(72) Inventor: Islam Khasanovich Raslambekov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 17/143,053

(22) Filed: Jan. 6, 2021

(51) Int. Cl.
*G06K 9/34* (2006.01)
*G06T 7/10* (2017.01)
*G06T 17/20* (2006.01)
*G06T 15/08* (2011.01)

(52) U.S. Cl.
CPC ............... *G06T 7/10* (2017.01); *G06T 15/08* (2013.01); *G06T 17/205* (2013.01); *G06T 2207/10072* (2013.01); *G06T 2207/30036* (2013.01); *G06T 2215/06* (2013.01)

(58) Field of Classification Search
CPC .................... A61C 7/002; G06T 17/00; G06T 2207/30036; G06T 7/00; G06T 7/10
See application file for complete search history.

(56) References Cited

U.S. PATENT DOCUMENTS

| | | |
|---|---|---|
| 5,975,893 A | 11/1999 | Chishti et al. |
| 6,183,248 B1 | 2/2001 | Chishti et al. |
| 6,227,850 B1 | 5/2001 | Chishti et al. |
| 6,309,215 B1 | 10/2001 | Phan et al. |
| 6,318,994 B1 | 11/2001 | Chishti et al. |
| 6,334,853 B1 | 1/2002 | Kopelman et al. |
| 6,371,761 B1 | 4/2002 | Cheang et al. |
| 6,386,878 B1 | 5/2002 | Pavlovskaia et al. |
| 6,398,548 B1 | 6/2002 | Muhammad et al. |
| 6,463,344 B1 | 10/2002 | Pavloskaia et al. |

(Continued)

FOREIGN PATENT DOCUMENTS

| | | |
|---|---|---|
| CN | 103700103 A | 4/2014 |
| CN | 108470365 A | 8/2018 |

(Continued)

OTHER PUBLICATIONS

Kumar et al., Improved Segmentation of Teeth in Dental Models, 2011, 2011 CAD Solutions, LLC, http://www.cadanda.com, pp. 21-224.*

*Primary Examiner* — Guillermo M Rivera-Martinez
(74) *Attorney, Agent, or Firm* — BCF LLP

(57) ABSTRACT

A method and a system for determining an orthodontic treatment for a plurality of teeth of a subject are provided. The method comprises: receiving a 3D representation of a first tooth and a second tooth, adjacent thereto, of the subject, of a plurality of teeth of the subject; obtaining a tooth-gingiva segmentation loop; identifying an outer set of vertices positioned outside the tooth-gingiva segmentation loop and an inner set of vertices positioned inside the tooth-gingiva segmentation loop; determining a shortest path from the outer set of vertices to the inner set of vertices; generating, based on the shortest path, a first interdental loop indicative of an interdental boundary between the first tooth and the second tooth, the first interdental loop intersecting the tooth-gingiva segmentation loop; generating a boundary between the first tooth and the second tooth, the boundary including the tooth-gingiva segmentation loop and the first interdental loop.

20 Claims, 7 Drawing Sheets

(56) References Cited

U.S. PATENT DOCUMENTS

| | | |
|---|---|---|
| 6,471,511 B1 | 10/2002 | Chishti et al. |
| 6,554,611 B2 | 4/2003 | Chishti et al. |
| 6,602,070 B2 | 8/2003 | Miller et al. |
| 6,665,570 B2 | 12/2003 | Pavloskaia et al. |
| 6,685,470 B2 | 2/2004 | Chishti et al. |
| 6,688,886 B2 | 2/2004 | Hughes et al. |
| 6,705,863 B2 | 3/2004 | Phan et al. |
| 6,726,478 B1 | 4/2004 | Isiderio et al. |
| 6,739,870 B2 | 5/2004 | Lai et al. |
| 6,767,208 B2 | 7/2004 | Kaza |
| 6,979,196 B2 | 12/2005 | Nikolskiy et al. |
| 7,004,754 B2 | 2/2006 | Kaufmann et al. |
| 7,040,896 B2 | 5/2006 | Pavlovskaia et al. |
| 7,059,850 B1 | 6/2006 | Phan et al. |
| 7,063,532 B1 | 6/2006 | Jones et al. |
| 7,123,767 B2 | 10/2006 | Jones et al. |
| 7,125,248 B2 | 10/2006 | Phan et al. |
| 7,134,874 B2 | 11/2006 | Chishti et al. |
| 7,220,122 B2 | 5/2007 | Chishti |
| 7,241,142 B2 | 7/2007 | Abolfathi et al. |
| 7,293,988 B2 | 11/2007 | Wen |
| 7,320,592 B2 | 1/2008 | Chishti et al. |
| 7,373,286 B2 | 5/2008 | Nikolskiy et al. |
| 7,377,778 B2 | 5/2008 | Chishti et al. |
| 7,428,481 B2 | 9/2008 | Nikolskiy et al. |
| 7,442,040 B2 | 10/2008 | Kuo |
| 7,545,979 B2 | 6/2009 | Fidrich et al. |
| 7,637,740 B2 | 12/2009 | Knopp |
| 7,689,398 B2 | 3/2010 | Cheng et al. |
| 7,771,195 B2 | 8/2010 | Knopp et al. |
| 7,826,646 B2 | 11/2010 | Pavlovskaia et al. |
| 7,841,858 B2 | 11/2010 | Knopp et al. |
| 7,844,429 B2 | 11/2010 | Matov et al. |
| 7,865,259 B2 | 1/2011 | Kuo et al. |
| 7,904,307 B2 | 3/2011 | Abolfathi et al. |
| 7,905,725 B2 | 3/2011 | Chishti et al. |
| 7,942,672 B2 | 5/2011 | Kuo |
| 7,993,134 B2 | 8/2011 | Wen |
| 8,038,444 B2 | 10/2011 | Kitching et al. |
| 8,044,954 B2 | 10/2011 | Kitching et al. |
| 8,108,189 B2 | 1/2012 | Chelnokov et al. |
| 8,131,393 B2 | 3/2012 | Matov et al. |
| 8,135,569 B2 | 3/2012 | Matov et al. |
| 8,244,390 B2 | 8/2012 | Kuo et al. |
| 8,439,672 B2 | 5/2013 | Matov et al. |
| 8,465,280 B2 | 6/2013 | Sachdeva et al. |
| 8,478,435 B2 | 7/2013 | Kuo et al. |
| 8,639,477 B2 | 1/2014 | Chelnokov et al. |
| 8,641,414 B2 | 2/2014 | Borovinskih et al. |
| 8,734,150 B2 | 5/2014 | Wen |
| 8,780,106 B2 | 7/2014 | Chishti et al. |
| 8,807,999 B2 | 8/2014 | Kuo et al. |
| 8,896,592 B2 | 11/2014 | Boltunov et al. |
| 8,897,902 B2 | 11/2014 | See et al. |
| 8,961,173 B2 | 2/2015 | Miller |
| 9,060,829 B2 | 6/2015 | Sterental et al. |
| 9,107,722 B2 | 8/2015 | Matov et al. |
| 9,161,823 B2 | 10/2015 | Morton et al. |
| 9,211,166 B2 | 12/2015 | Kuo et al. |
| 9,326,831 B2 | 5/2016 | Cheang |
| 9,345,557 B2 | 5/2016 | Anderson et al. |
| 9,375,293 B2 | 6/2016 | Taub et al. |
| 9,375,300 B2 | 6/2016 | Matov et al. |
| 9,414,897 B2 | 8/2016 | Wu et al. |
| 9,433,476 B2 | 9/2016 | Khardekar et al. |
| 9,529,970 B2 | 12/2016 | Andreiko |
| 9,592,103 B2 | 3/2017 | Taub et al. |
| 9,610,140 B2 | 4/2017 | Anderson et al. |
| 9,622,834 B2 | 4/2017 | Chapoulaud et al. |
| 9,792,413 B2 | 10/2017 | Badawi |
| 9,844,424 B2 | 12/2017 | Wu et al. |
| 10,011,050 B2 | 7/2018 | Kitching et al. |
| 10,076,389 B2 | 9/2018 | Wu et al. |
| 10,307,222 B2 | 6/2019 | Morton et al. |
| 10,332,164 B2 | 6/2019 | Abolfathi et al. |
| 10,383,704 B2 | 8/2019 | Kitching |
| 10,405,947 B1 | 9/2019 | Kaza et al. |
| 10,405,951 B1 | 9/2019 | Kopelman et al. |
| 10,413,385 B2 | 9/2019 | Sherwood et al. |
| 10,433,934 B2 | 10/2019 | Kopelman |
| 10,463,452 B2 | 11/2019 | Matov et al. |
| 10,470,846 B2 | 11/2019 | Kopelman et al. |
| 10,524,880 B2 | 1/2020 | Wen |
| 10,553,309 B2 | 2/2020 | Trosien et al. |
| 10,561,476 B2 | 2/2020 | Matov et al. |
| 10,595,965 B2 | 3/2020 | Khardekar et al. |
| 10,617,489 B2 | 4/2020 | Grove et al. |
| 10,650,517 B2 | 5/2020 | Parpara et al. |
| 10,653,503 B2 | 5/2020 | Boltunov et al. |
| 10,695,147 B1 | 6/2020 | Raslambekov |
| 10,729,522 B2 | 8/2020 | Jordan et al. |
| 10,751,149 B1 | 8/2020 | Raslambekov |
| 10,779,909 B2 | 9/2020 | Salah et al. |
| 10,783,629 B2 | 9/2020 | Parpara et al. |
| 10,792,127 B2 | 10/2020 | Kopelman et al. |
| 10,813,721 B2 | 10/2020 | Sterental et al. |
| 2003/0039941 A1* | 2/2003 | Chishti ............ A61C 9/0046 433/24 |
| 2004/0096799 A1* | 5/2004 | Hughes ............ A61C 7/00 433/24 |
| 2005/0244791 A1 | 11/2005 | Davis et al. |
| 2006/0281041 A1* | 12/2006 | Rubbert ............ A61C 9/0053 433/24 |
| 2009/0220918 A1* | 9/2009 | Kaufmann ............ A61C 9/00 433/213 |
| 2013/0095446 A1 | 4/2013 | Andreiko et al. |
| 2013/0218531 A1* | 8/2013 | Deichmann ............ A61C 9/004 703/1 |
| 2013/0308843 A1* | 11/2013 | Tank ............ G06T 7/149 382/128 |
| 2013/0325431 A1* | 12/2013 | See ............ G06T 19/00 703/11 |
| 2014/0288894 A1 | 9/2014 | Chishti et al. |
| 2014/0379356 A1* | 12/2014 | Sachdeva ............ A61C 7/002 705/2 |
| 2016/0302885 A1 | 10/2016 | Matov et al. |
| 2017/0035536 A1 | 2/2017 | Alvarez Garcia et al. |
| 2017/0079748 A1 | 3/2017 | Andreiko |
| 2017/0100214 A1* | 4/2017 | Wen ............ G16H 30/20 |
| 2018/0039755 A1 | 2/2018 | Matov et al. |
| 2018/0165818 A1 | 6/2018 | Tsai et al. |
| 2018/0303581 A1* | 10/2018 | Martz ............ A61C 7/002 |
| 2018/0304497 A1 | 10/2018 | Kitching et al. |
| 2018/0333226 A1 | 11/2018 | Tsai et al. |
| 2019/0000592 A1 | 1/2019 | Cam et al. |
| 2019/0046295 A1 | 2/2019 | Morton et al. |
| 2019/0125493 A1* | 5/2019 | Salah ............ G16H 30/20 |
| 2019/0282333 A1 | 9/2019 | Matov et al. |
| 2019/0314117 A1 | 10/2019 | Morton et al. |
| 2019/0333224 A1 | 10/2019 | Liu et al. |
| 2019/0357997 A1 | 11/2019 | Shi et al. |
| 2020/0000551 A1 | 1/2020 | Li et al. |
| 2020/0000552 A1 | 1/2020 | Mednikov et al. |
| 2020/0015936 A1* | 1/2020 | Ye ............ A61C 7/023 |
| 2020/0022790 A1 | 1/2020 | Fisker et al. |
| 2020/0146776 A1 | 5/2020 | Matov et al. |
| 2020/0229900 A1 | 7/2020 | Cunliffe et al. |
| 2020/0297459 A1 | 9/2020 | Grove et al. |
| 2020/0306012 A1* | 10/2020 | Roschin ............ G06F 30/10 |

FOREIGN PATENT DOCUMENTS

| | | |
|---|---|---|
| CN | 110378917 A | 10/2019 |
| CN | 111292857 A | 6/2020 |
| WO | 98058596 A1 | 12/1998 |
| WO | 00019928 A1 | 4/2000 |
| WO | 00019930 A1 | 4/2000 |
| WO | 00019931 A1 | 4/2000 |
| WO | 00069356 A1 | 11/2000 |
| WO | 00069357 A1 | 11/2000 |
| WO | 01074268 A1 | 11/2001 |

(56) References Cited

FOREIGN PATENT DOCUMENTS

| WO | 2018085718 | A2 | 5/2018 |
| WO | 2019089989 | A2 | 5/2019 |
| WO | 2020182920 | A1 | 9/2020 |

\* cited by examiner

SYSTEMS AND METHODS FOR TOOTH SEGMENTATION

The present technology relates to systems and methods for planning an orthodontic treatment for a patient, in general; and more specifically, to systems and methods for tooth segmentation including determining a boundary between a given pair of adjacent teeth of patient's teeth (interdental boundary).

BACKGROUND

Orthodontic treatment plans for treating malocclusion disorders of a subject (or for assessing efficacy of an already ongoing one), typically use various anthropometric parameters associated with a subject's skull, such as those associated with a subject's teeth (including crown portions and root portions thereof), and a subject's gingiva. Such parameters may be, for example, obtained or otherwise, determined through analyzing corresponding image data.

For example, by applying intraoral scanning techniques, a 3D model (such as a 3D mesh) of a subject's arch form representative of the subject's teeth and the subject's gingiva may be obtained. Further, individual crown 3D portions models of the crown portions of the subject's teeth may be segmented from the 3D model of the subject's arch form; and some of the anthropometric parameters associated with the crown portions may be used for devising an orthodontic treatment. Broadly speaking, these parameters, for a given tooth, may include, for example, overall dimensions of a crown portion thereof, a number of cusps, and certain other anatomical features associated therewith, such as data indicative of lobes, developmental grooves, a marginal ridge, and the like. When planning the orthodontic treatment, such parameters may be used, for example, to determine a center of resistance (CR) point associated with the given tooth, which may further enable to model movements of the crown portion of the given tooth relative to crown portions of other of the subject's teeth to avoid collisions therewith, as an example. In another aspect, the parameters associated with the crown portion and determined, based on a crown 3D model thereof, may be used for generating a tooth 3D model of the given tooth that may further be used for a more detailed analysis of tooth movements of the given tooth in the course of the orthodontic treatment.

However, the intraoral scanning techniques may have specific drawbacks that may not allow generating an accurate crown 3D model. For example, an intraoral scanner may be incapable of receiving all amount of light reflected off the crown portion while capturing an image thereof. This may result in generating certain image artefacts (also referred to herein as "digital garbage" or "undesired portions" of the 3D model), that is, portions of the crown 3D model, within the 3D model of the subject's arch form, forming no part of the actual configuration of the crown portion of the given tooth nor of other anatomical structures of the subjects, such as the subject's gingiva. For example, these image artefacts may typically be found in portions of the crown 3D models of the crown portions associated with interdental spaces—buccal regions located between pairs of adjacent teeth of the subject's teeth. Accordingly, the image artefacts may impede from accurately segmenting the crown 3D model from the 3D model of the subject's arch form; and as a result, a segmented crown 3D model may inaccurately represent actual anatomical features of the crown portion of the given tooth.

Consequently, the segmented crown 3D model may not provide reliable input data for determining the orthodontic treatment for the subject as the parameters associated with the crown portion determined based thereon, as well as the tooth 3D model of the given tooth generated based thereon may hence be considerably skewed. This may affect predictability and efficacy of the planned orthodontic treatment.

Certain prior art approaches have been proposed to tackle the above-identified technical problem, which are directed to automatic segmentation of 3D models of crown portions from a 3D model of a subject's arch form.

U.S. Pat. No. 10,695,147-B1 issued on Jun. 30, 2020, assigned to Oxilio Ltd., and entitled "Method and System for Dental Boundary Determination" discloses methods, systems, and apparatuses for determining a boundary between teeth and gingiva of an arch form and/or between teeth and other teeth. Curves may be defined on the surface of teeth and gingiva in the arch form. An indication of curvature at various points on the curves may be determined. A predicted likelihood parameter that each of the points corresponds to the boundary between the teeth and gingiva may be determined based on the indication of curvature. A smoothing function and the predicted likelihood parameter may be used to determine a boundary point for each curve. The boundary points may be connected to form the boundary between the teeth and gingiva.

United States Patent Application Publication No.: 2018/303,581-A1 published on Oct. 25, 2018, assigned to Archform Inc., and entitled "Fabrication of Dental Appliances" discloses systems and method for fabrication of dental appliances. An example method includes receiving data identifying approximate locations of individual teeth in a three-dimensional digital dental model representing an impressioned position of a patient's dentition. The example method may also include generating component models corresponding to individual teeth for each of the identified approximate locations. The component models may be disposed at initial positions based on the impressioned position of the patient's dentition. The example method also includes determining target positions for the component models and generating a tooth-positioning appliance design based on the determined target positions for the component models. The method may also include causing a tooth-positioning appliance to be fabricated based on the tooth-positioning appliance design.

United States Patent Application Publication No.: 2019/357,997-A1 published on Nov. 28, 2019, assigned to Align Technology Inc., and entitled "Tooth Segmentation Based on Anatomical Edge Information" discloses orthodontic systems and methods for automatically segmenting a person's teeth. Systems, methods and processes are provided to properly segment the teeth of a person's teeth from an image of the person's face showing at least some of the person's teeth (e.g., dental arch). Methods and systems are provided to automatically detect dental edges after a dental scan. Also described herein are methods and systems for generating a simulated image of the person's face from the final segmentation of the person's teeth in which the segmented teeth have been moved from their original position, including a new position based on an orthodontic treatment plan.

SUMMARY

It is an object of the present technology to ameliorate at least some of the inconveniences present in the prior art.

Developers of the present technology have appreciated that the crown 3D model of the crown portion of the given tooth may be more accurately segmented from the 3D model of the 3D model of the subject's arch form based on a plurality of specifically identified closed contours (referred to herein as a "plurality of interdental loops"), allowing segmenting the crown 3D model of the crown portion of the given tooth from both a gingiva 3D model of the subject's gingiva and those of adjacent teeth of the subject.

More specifically, the developers have devised a method for segmenting the crown 3D model from the 3D model of the subject's arch form including: (i) obtaining a tooth-gingiva segmentation loop, the tooth-gingiva segmentation loop segmenting the crown 3D model from the gingiva 3D model of the subject's gingiva; (ii) identifying at least one vertex associated with the crown 3D model positioned outside the tooth-gingiva segmentation loop; and (iii) determining a given one of the plurality of interdental loops intersecting the tooth-gingiva segmentation loop.

Further, non-limiting embodiments of the present technology are based on a premise that each one of the plurality of interdental loops may thus be differently defined relative to the crown 3D model. For example, the given one of the plurality of interdental loops may be representative of so called "bridges" or "tunnels" defined between the crown 3D model associated with the given tooth and an other crown 3D model associated with an other tooth, adjacent to the given one—in other words, within an interdental space therebetween.

Thus, by iteratively determining a given next one of the plurality of interdental loops, until no vertex of the crown 3D model is positioned outside any one of the tooth-gingiva segmentation loop and the plurality of interdental loops, certain non-limiting embodiments of the present technology are directed to generating a boundary segmenting the crown 3D model of the crown portion of the given tooth from the gingiva 3D model and the other crown 3D model associated with the adjacent tooth. Thus, so segmented crown 3D model may be used for generating a more accurate tooth 3D model of the given tooth allowing for planning more accurate and effective orthodontic treatments.

More specifically, in accordance with a first broad aspect of the present technology, there is provided a method of determining an orthodontic treatment for a subject. The method is executable by a processor of an electronic device. The method comprises: receiving, by the processor, a 3D representation of at least a first tooth and a second tooth, adjacent thereto, of a plurality of teeth of the subject, the 3D representation including vertices representative of a surface of the first tooth and the second tooth; obtaining, by the processor, a tooth-gingiva segmentation loop, the tooth-gingiva segmentation loop segmenting, in the 3D representation, the first tooth from an adjacent gingiva; identifying, by the processor, relative to the tooth-gingiva segmentation loop, an outer set of vertices positioned outside the tooth-gingiva segmentation loop and an inner set of vertices positioned inside the tooth-gingiva segmentation loop; identifying, by the processor, a given outer vertex from the outer set of vertices and a given inner vertex from the inner set of vertices forming a shortest path between the outer set of vertices and the inner set of vertices, the shortest path not intersecting the tooth-gingiva segmentation loop; generating, by the processor, based on the shortest path, a first interdental loop, the first interdental loop being at least partially indicative of an interdental boundary between the first tooth and the second tooth, the first interdental loop intersecting the tooth-gingiva segmentation loop; determining, by the processor, if there is at least one vertex of the 3D representation associated with the first tooth positioned outside any one of the tooth-gingiva segmentation loop and the first interdental loop; in response to determining that no vertices of the 3D representation associated with the first tooth are positioned outside any one of the tooth-gingiva segmentation loop and the first interdental loop: generating, by the processor, based at least on the tooth-gingiva segmentation loop and the first interdental loop, a first tooth 3D representation of the first tooth, for use in determining the orthodontic treatment for the subject.

In some implementations of the method, the method further comprises in response to identifying at least one vertex of the 3D representation associated with the first tooth positioned outside any one of the tooth-gingiva segmentation loop and the first interdental loop: determining, based on the at least one vertex, a second interdental loop intersecting the first interdental loop; and generating the first tooth 3D representation based on the tooth-gingiva segmentation loop, the first interdental loop, and the second interdental loop.

In some implementations of the method, the first interdental loop and the second interdental loop are ones of a plurality of interdental loops, and the method further comprises iteratively executing, until no vertices of the 3D representation associated with the first tooth are positioned outside any one of the tooth-gingiva segmentation loop and the plurality of interdental loops: determining, based on at least one vertex of the 3D representation associated with the first tooth lying outside at least one of the plurality of interdental loops and the tooth-gingiva segmentation loop, a next interdental loop intersecting at least one of the plurality of interdental loops; including the next interdental loop in the plurality of interdental loops; and generating the first tooth 3D representation based on the tooth-gingiva segmentation loop and the plurality of interdental loops.

In some implementations of the method, the method further comprises determining, by the processor, based on the 3D representation, the tooth-gingiva segmentation loop, the determining comprising analyzing, by the processor, based on the 3D representation, a curvature of the first tooth.

In some implementations of the method, the identifying the outer set of vertices and the inner set of vertices is executed in response to at least one vertex of the 3D representation associated with the first tooth being positioned outside the tooth-gingiva segmentation loop, the method further comprising determining, by the processor, whether there is the at least one vertex associated with the first tooth 3D representation positioned outside the tooth-gingiva segmentation loop.

In some implementations of the method, the identifying the outer set of vertices and the inner set of vertices comprises identifying a given one of a plurality of mesh elements associated with one of the outer set of vertices and the inner set of vertices, such that: the given one of the plurality of mesh elements is representative of the 3D representation; the given one of the plurality of mesh elements has yet not been identified as being associated with the one of the outer set of vertices and the inner set of vertices; the given one of the plurality mesh elements is adjacent to an other one of the plurality of mesh elements previously identified; and at least one vertex of the given one of the plurality of mesh elements is part of the tooth-gingiva segmentation loop.

In some implementations of the method, the identifying the given outer vertex and the given inner vertex includes applying a shortest path algorithm.

In some implementations of the method, the shortest path algorithm is a Dijkstra's shortest path algorithm.

In some implementations of the method, the method further comprises causing display of the first tooth 3D representation of the first tooth.

In some implementations of the method, the method further comprises determining the orthodontic treatment based on the first tooth 3D representation.

In some implementations of the method, the method further comprises storing the first tooth 3D representation in a memory.

In accordance with a second broad aspect of the present technology, there is provided a system for determining an orthodontic treatment. The system comprises: a processor and a non-transitory computer-readable medium comprising instructions. The processor, upon executing the instructions, is configured to: receive a 3D representation of at least a first tooth and a second tooth, adjacent thereto, of a plurality of teeth of the subject, the 3D representation including vertices representative of a surface of the first tooth and the second tooth; obtain a tooth-gingiva segmentation loop, the tooth-gingiva segmentation loop segmenting, in the 3D representation, the first tooth from an adjacent gingiva; identify relative to the tooth-gingiva segmentation loop, an outer set of vertices positioned outside the tooth-gingiva segmentation loop and an inner set of vertices positioned inside the tooth-gingiva segmentation loop; identify a given outer vertex from the outer set of vertices and a given inner vertex from the inner set of vertices forming a shortest path between the outer set of vertices and the inner set of vertices, the shortest path not intersecting the tooth-gingiva segmentation loop; generate, based on the shortest path, a first interdental loop, the first interdental loop being at least partially indicative of an interdental boundary between the first tooth and the second tooth, the first interdental loop intersecting the tooth-gingiva segmentation loop; determine if there is at least one vertex of the 3D representation associated with the first tooth positioned outside any one of the tooth-gingiva segmentation loop and the first interdental loop; in response to determining that no vertices of the 3D representation associated with the first tooth are positioned outside any one of the tooth-gingiva segmentation loop and the first interdental loop: generate, based at least on the tooth-gingiva segmentation loop and the first interdental loop, a first tooth 3D representation loop of the first tooth.

In some implementations of the system, the processor is further configured to: in response to identifying at least one vertex of the 3D representation associated with the first tooth positioned outside any one of the tooth-gingiva segmentation loop and the first interdental loop: determine, based on at least one vertex, a second interdental loop intersecting the first interdental loop; generate the first tooth 3D representation based on the tooth-gingiva segmentation loop, the first interdental loop, and the second interdental loop.

In some implementations of the system, the first interdental loop and the second interdental loop are ones of a plurality of interdental loops, and the processor being further configured to iteratively execute, until no vertices of the 3D representation associated with the first tooth is positioned outside any one of the tooth-gingiva segmentation loop and the plurality of interdental loops: determining, based on at least one vertex of the 3D representation associated with the first tooth lying outside at least one of the plurality of interdental loops and the tooth-gingiva segmentation loop, a next interdental loop intersecting at least one of the plurality of interdental loops; including the next interdental loop in the plurality of interdental loops; generating the first tooth 3D representation based on the tooth-gingiva segmentation loop and the plurality of interdental loops.

In some implementations of the system, the processor is further configured to determine, based on the 3D representation, the tooth-gingiva segmentation loop, the determining comprising analyzing a curvature of the first tooth.

In some implementations of the system, the processor is configured to identify the outer set of vertices and the inner set of vertices in response to at least one vertex of the 3D representation associated with the first tooth being positioned outside the tooth-gingiva segmentation loop, and the processor being further configured to determine whether there is the at least one vertex associated with the first tooth 3D representation positioned outside the tooth-gingiva segmentation loop.

In some implementations of the system, in order to identify the outer set of vertices and the inner set of vertices, the processor is further configured to identify a given one of a plurality of mesh elements associated with one of the outer set of vertices and the inner set of vertices, such that: the given one of the plurality of mesh elements is representative of the 3D representation; the given one of the plurality of mesh elements has yet not been identified as being associated with the one of the outer set of vertices and the inner set of vertices; the given one of the plurality mesh elements is adjacent to an other one of the plurality of mesh elements previously identified; and at least one vertex of the given one of the plurality of mesh elements is part of the tooth-gingiva segmentation loop.

In some implementations of the system, to identify the given outer vertex and the given inner vertex, the processor is configured to apply a shortest path algorithm.

In some implementations of the system, the shortest path algorithm is a Dijkstra's shortest path algorithm.

In some implementations of the system, the processor is further configured to cause display of the first tooth 3D representation of the first tooth.

In some implementations of the system, the processor is further configured to determine the orthodontic treatment based on the first tooth 3D representation.

In some implementations of the system, the system further comprises a memory communicatively coupled with the processor, and the processor is further configured to store the first tooth 3D representation in the memory.

In the context of the present specification, the term "tunnel" refers to a portion of an interdental space between a given pair of adjacent teeth where there is no contact of the adjacent teeth, thereby defining an opening therebetween. The tunnel may extend in a buccal-lingual direction between the given pair of adjacent teeth.

Further, in the context of the present specification, the term "bridge" refers to a portion between the given pair of adjacent teeth defining a contact region. The contact region may be closer to an occlusal plane of the teeth than the gingiva. The bridge may be in a mesial-distal direction.

In the context of the present specification, the term "orthodontic treatment" is broadly referred to as any type of medical intervention aimed at correcting malocclusions associated with the subject, including surgical and non-surgical manipulations, such as, but not limited to, using aligners. Further, the orthodontic treatment, as referred to herein, may be determined by a professional practitioner in the field of dentistry (such as an orthodontist, a maxillofacial surgeon, for example), or automatically by a specific software, based on respective image data and input parameters associated with the subject.

In the context of the present specification, the term "augmented crown 3D representation" of a given crown portion of a subject refers to a 3D representation thereof (such as a 3D mesh) segmented from an associated 3D representation of an arch form of the subject; and more specifically from a 3D representation of other crown portions adjacent to the given one, as well as, from an adjacent gingiva portion. As opposed to an unsegmented crown 3D representation of the given crown portion provided as part of the 3D representation of the arch form, the augmented crown 3D representation may reproduce an actual anatomical configuration of the given crown portion more accurately and may thus allow, as an example, generating, based thereon, a more accurate tooth 3D representation of an associated tooth of the subject. Therefore, to refer to the crown 3D representation of the given crown portion segmented from the surrounding tissue, in the present specification, the terms "augmented crown 3D representation" and "tooth 3D representation" may be used interchangeably.

Further, in the context of the present specification, the term "comprehensive arch form 3D representation" of the arch form of the subject refers to a 3D representation thereof including tooth 3D representations of teeth of the subject, in their entirety, and that of a gingiva of the subject. Thus, such a comprehensive arch form 3D representation of the arch form is representative not only of an actual intraoral anatomy of the subject, but also of tooth roots of the subject's teeth, which allows modelling movements thereof in the course of the planned orthodontic treatment, as an example.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
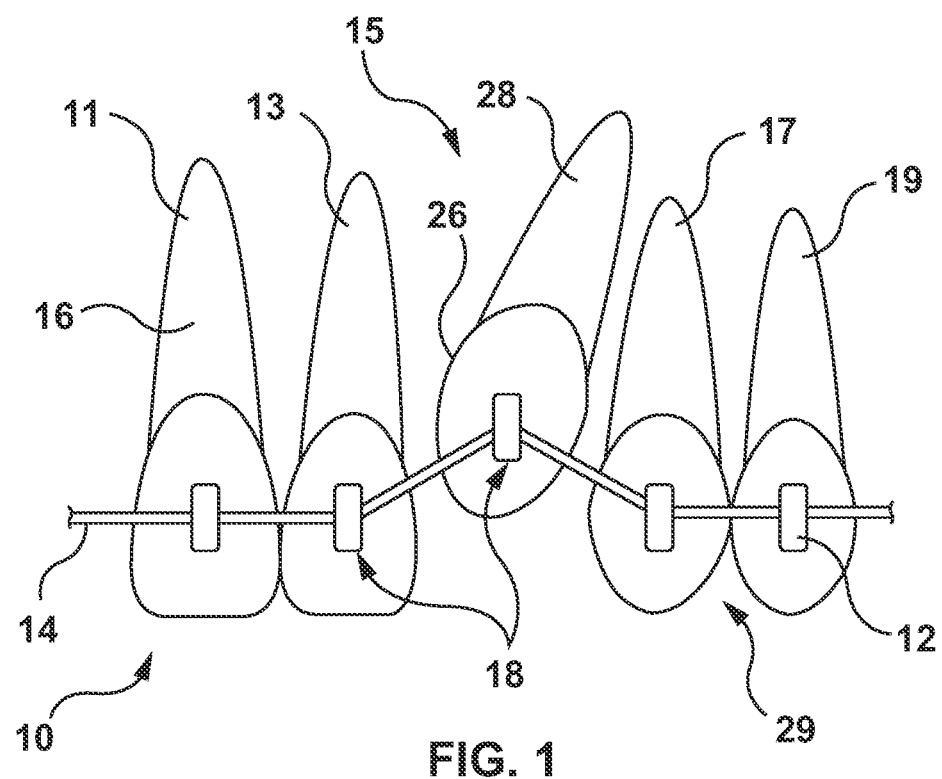
FIG. 1 depicts a schematic diagram of an orthodontic appliance attached to five teeth of a plurality of teeth of a subject, in accordance with certain non-limiting embodiment of the present technology.

Certain aspects and embodiments of the present technology are directed to improving approaches to generating 3D representations of teeth introduced in the prior art. More specifically, certain non-limiting embodiments of the present technology are directed to methods of and systems for determining a boundary between a given pair of adjacent teeth of a plurality of teeth of a subject for generating an augmented crown 3D representation of the crown portion. In other words, the present technology is directed to segmenting, in a 3D representation, a crown portion of a given tooth from an adjacent tooth, as well as surrounding gingiva, to achieve a more accurate 3D representation of the crown portion. The subject may be receiving, or soon to receive, an orthodontic treatment. An accurate 3D representation of the crown portion may allow for a more accurate planning of the orthodontic treatment, which can in turn improve overall effectiveness and efficacy of the orthodontic treatment. More specifically, using such a 3D representation may allow modelling forces imposed on the tooth more accurately, and thus a more accurate modelling of the respective movements thereof in the course of the orthodontic treatment.

This is achieved in certain non-limiting embodiments of the present technology by (1) generating the augmented crown 3D representation of the crown portion, including a boundary with the adjacent tooth, based on at least one interdental loop associated with the crown portion. This can be determined using only a 3D model of the subject's arch form obtained through conventional imaging techniques (such as the intraoral scanning techniques), without the need for obtaining and processing additional, more accurate, image data associated with the subject, including, for example, CT and/or MR scans, or panoramic radiographs representative of the arch form of the subject including those of the given tooth; and (2) generating the augmented crown 3D representation of the crown portion, which is thus free of digital artefacts having been introduced to the raw crown 3D representation by the conventional imaging techniques within regions indicative of interdental spaces between adjacent teeth. Thus, the so generated augmented crown 3D representation of the crown portion may be representative of an actual anatomical configuration of the crown portion and derived from the raw crown 3D representation by applying thereto a specifically determined plurality of closed contours indicative of a boundary between the crown portion of the given tooth, teeth adjacent thereto, and the subject's gingiva.

Thus, embodiments of methods and systems provided herein allow achieving a higher accuracy in planning and predictability of orthodontic treatments, and consequently, resolving malocclusions more efficiently and effectively whilst using more commonly available imaging techniques for generating the image data associated with the subject. For example, the image data used for planning the orthodontic treatment, in some non-limiting embodiments of the present technology, may include images indicative of a surface of the subject's gingiva and respective surfaces of the subject's teeth, such as those obtained with intraoral scans. Images of the roots of the subject s teeth or interdental spaces may not be required. This may also allow for a faster processing of such image data by a processor.

It should be noted that, according to some non-limiting embodiments of the present technology, the methods for generating the augmented crown 3D representation for the given tooth described herein may be considered as a stand-alone process. However, in other non-limiting embodiments of the present technology, these methods may be part of a more general process of generating a comprehensive 3D representation of a subject's arch form—such as that described in a co-owned U.S. patent application Ser. No. 16/877,972, allowed on Oct. 5, 2020, entitled "SYSTEMS AND METHODS FOR PLANNING AN ORTHODONTIC TREATMENT", the content of which is hereby incorporated by reference in its entirety.

More specifically, according to certain non-limiting embodiments of the present technology, the methods described herein may include:

obtaining image data of the subject's arch form, such as an arch form 3D representation in a form of a 3D mesh representative of a surface of, at least, crown portions of a first tooth and a second tooth of the given pair of adjacent teeth and the gingiva of the subject;

obtaining a tooth-gingiva segmentation loop, the tooth-gingiva segmentation loop segmenting a first crown 3D representation associated with the first tooth from the gingiva 3D representation of the subject's gingiva;

determining, based on at least one vertex associated with the first crown 3D representation positioned outside the tooth-gingiva segmentation loop, a given one of a plurality of interdental loops, the given one of the plurality of interdental loops segmenting the first tooth from the second tooth;

generating, based on the tooth-gingiva segmentation loop and the plurality of interdental loops, an augmented crown 3D representation of the first tooth; and using the augmented first crown 3D representation for generating the orthodontic treatment for the subject.

How each of the above-listed steps of the claimed methods can be implemented, in accordance with certain non-limiting embodiments of the present technology, will be described below with reference to corresponding Figures.

Orthodontic Treatment

Figure 2:
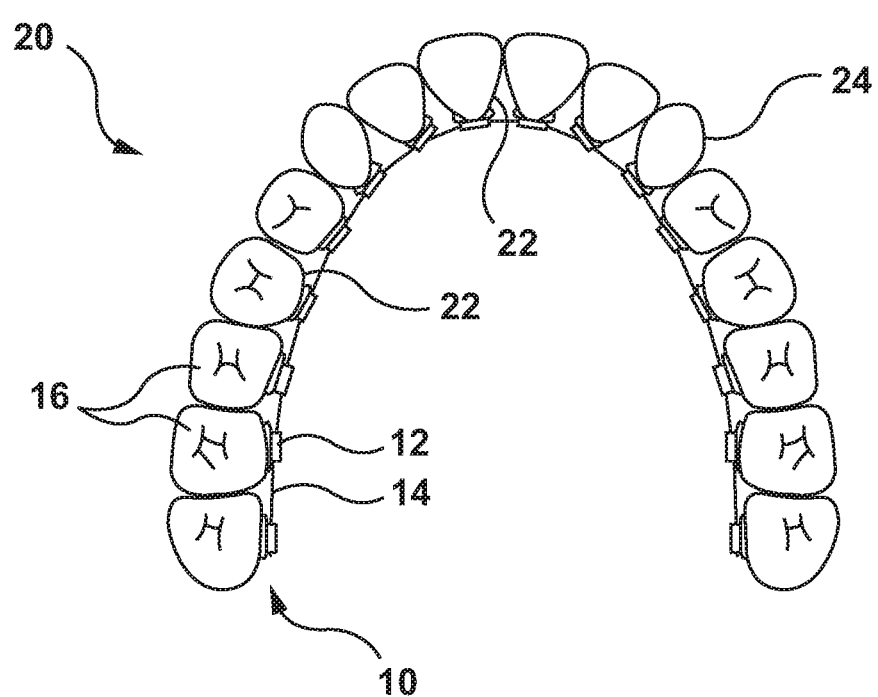
FIG. 2 depicts a schematic diagram of an upper arch form of the subject of FIG. 1 showing the orthodontic appliance of FIG. 1 attached thereto, in accordance with certain non-limiting embodiment of the present technology.

Referring initially to FIGS. 1 and 2, there is depicted an example orthodontic appliance 10 as part of the orthodontic treatment, to which certain aspects and embodiments of the present technology can be applied. Generally speaking, the orthodontic appliance 10 comprises brackets 12 and an archwire 14. The archwire 14 is made of a shape memory alloy such as Nitinol™, but can also be made of any other shape memory alloy or material having certain elasticity properties. The brackets 12 are respectively provided on some of upper teeth 16 (depicted individually as 11, 13, 15, 17, and 19), and the archwire 14 extends between, and is connected to each of the brackets 12. In the depicted embodiments of FIG. 1, the orthodontic treatment is aimed at misalignment of the tooth 15; hence the orthodontic appliance 10 is configured to cause the tooth 15 to move in a predetermined direction (such as downwardly) for alignment thereof with neighbouring ones of the upper teeth 16, that is, teeth 11, 13, 17, and 19.

As it can be appreciated from FIG. 1, a first tooth 15 includes a first crown portion 26 and a first root portion 28. The archwire 14 imposes a given force, caused by bends 18, on the first tooth 15 at a respective one of the brackets 12 having been installed on the first crown portion 26. Thus, due to the shape memory effect of the archwire 14, the first tooth 15 will gradually move to an aligned position relative to the other one of the upper teeth 16.

With reference to FIG. 2, as one non-limiting example, the orthodontic appliance 10 has been applied to all the upper teeth 16 of an upper arch form 20 of the subject, with the brackets 12 being attached to an internal surface 22 of the upper teeth 16. However, it should be noted that, in another non-limiting example, the orthodontic appliance 10 may be configured to be installed on an external surface 24 of the upper teeth 16.

It is contemplated that, according to some non-limiting embodiments of the present technology, the orthodontic appliance 10 may comprise orthodontic appliances of different types, shapes, sizes and configurations, such as, without limitation, multi-strand wires, strips, retainers, and plates. Furthermore, the bends 18 in the archwire 14 may comprise rounded corners or loops. It will also be appreciated that the orthodontic appliance 10 may be used for treating any type of teeth misalignment or malocclusion, including but not limited to closing gaps ("space closure"), creating/widening gaps, tooth rotation, tooth intrusion/extrusion, and translation, to name a few.

It is contemplated that, before installing the orthodontic appliance 10 onto the upper teeth 16 for the alignment of the first tooth 15, movements thereof, in the course of the orthodontic treatment, should be modelled to ensure that the first tooth 15 will eventually reach the aligned position over an expected period. To that end, an arch form 3D representation of the upper arch form 20 may be obtained, and crown 3D representations of crown portions (such as the first crown portion 26 of the first tooth 15) of the upper teeth 16 may be generated based thereon. Further, a first crown 3D representation of the first crown portion 26 may be used to model the given force to be applied onto the first tooth 15, which may include, without being limited to: a magnitude of the given force, a direction thereof, and an application point thereof within the first crown portion 26. Accordingly, based on the crown 3D representations of the crown portions, the modelling may, for example, allow avoiding collisions between the first crown portion 26 of the first tooth 15 with any one of those teeth of the upper teeth 16 adjacent thereto.

In certain cases, the modelling of the tooth movements may be conducted to prevent other undesired effects of the orthodontic treatment. For example, the modelling may allow ensuring that the current orthodontic treatment would not cause damage to any of the upper teeth 16 at the level of their root portions, as well as to other structures associated therewith, such as tissues of an upper gingiva (such as an upper gingiva 36 depicted in FIG. 6), those of a maxillary alveolar bone (not depicted), proximal nerve pathways and blood vessels (not depicted), and the like. Further, when modelling tooth movements, considerations can be made in respect of overall comfort of the orthodontic treatment for the subject, on which his or her tolerance and adherence to the orthodontic treatment may depend.

However, a first crown 3D representation of the first crown 26 may have been inaccurately generated based on the arch form 3D representation of the upper arch form 20, which may impede accurate modelling of the movements of the first tooth 15, in the course of the orthodontic treatment. Thus, the first crown 3D representation may include certain image artefacts, generated due to imperfection of certain imaging techniques (such as image artefacts generated by the intraoral scanning techniques, as will be described below), using which for planning the orthodontic treatment may therefore result in certain undesired effects thereof to the subject.

Figure 3:
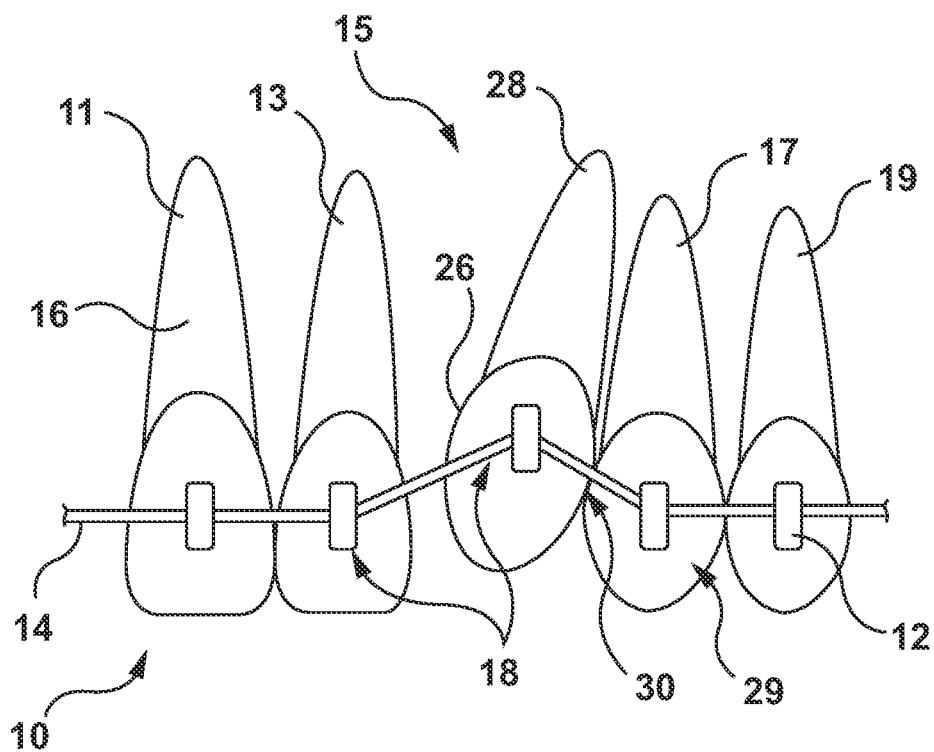
FIG. 3 depicts a schematic diagram of an intermediate phase of the orthodontic treatment including applying the orthodontic appliance of FIG. 1, in accordance with certain non-limiting embodiments of the present technology.

For example, with reference to FIG. 3, there is depicted a schematic diagram of a phase of the orthodontic treatment based on applying the orthodontic appliance 10 to the upper teeth 16, in accordance with certain non-limiting embodiments of the present technology. The depicted phase may be an intermediate phase or an initial phase, for example.

As it can be appreciated, at the phase depicted in FIG. 3, the first crown portion 26 of the first tooth 15, in the course of the movement thereof towards the aligned position, collides with a second crown portion 29 of the second tooth 17 adjacent thereto, thereby forming a collision area 30. Accordingly, the collision area 30 may be associated with such undesired effects as damage of one of the first crown portion 26 and the second crown portion 29 (for example, chipping or cracks), or discomfort (pain, for example) caused to the subject.

Further, the first crown 3D representation of the first crown portion 26 roughly segmented from the arch form 3D representation of the upper arch form 20 may not enable to restore an accurate representation of the first root portion 28, which may further result in undesired effects of the planned orthodontic treatment with regard to the root portions of the upper teeth 16. Thus, in another example (not depicted), the collision may occur between the first root portion 28 of the first tooth 15 and a second root portion (not separately labelled) of the second tooth 17, which may result in damage of one of the first root portion 28 and the second root portion (not separately labelled) of the second tooth 17 causing excessive pressure therebetween, which may further result in pain to the subject.

In yet another example (not depicted), the first root portion 28 may deviate in another direction causing damage to the upper gingiva 36, which may result in the first root portion 28 protruding through the upper gingiva 36 causing to the subject, for example, an aesthetic defect or, again, pain from using the orthodontic appliance 10.

Overall, for comprehensive analysis of the movements and determining intermediate positions of the first tooth 15, as a whole, during the orthodontic treatment, the first crown 3D representation of the first crown portion 26 may need to be accurately segmented from the arch form 3D representation of the upper arch form 20. To that end, according to certain non-limiting embodiments of the present technology, a plurality of interdental loops outlining the image artefacts between crown 3D representations of crown portions of a given pair of adjacent teeth, such as the first crown portion 26 and the second crown portion 29, may be determined based on the arch form 3D representation. Further, using so segmented first crown 3D representation may allow for reconstruction of a more accurate representation of the first root portion 28, and consequently, that of the first tooth 15, which may finally result in planning more effective and efficient orthodontic treatments for the subject, aimed at mitigating the risks of at least some of the undesired effects thereof described above. How the arch form 3D representation of the upper arch form 20 can be generated, as well as how the first crown 3D representation can be segmented therefrom will be described below with reference to FIGS. 6 to 9.

System

Figure 4:
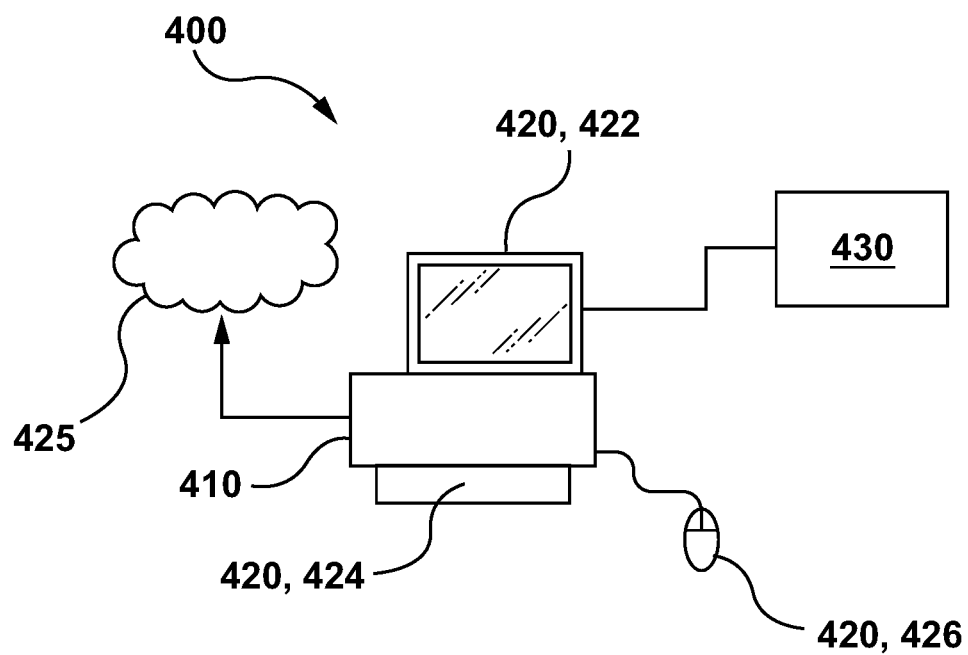
FIG. 4 depicts a schematic diagram of a system for determining a boundary between a given pair of adjacent teeth of the plurality of teeth of the subject of FIG. 1 based on a 3D representation of an arch form associated therewith, in accordance with certain embodiments of the present technology.
Figure 5:
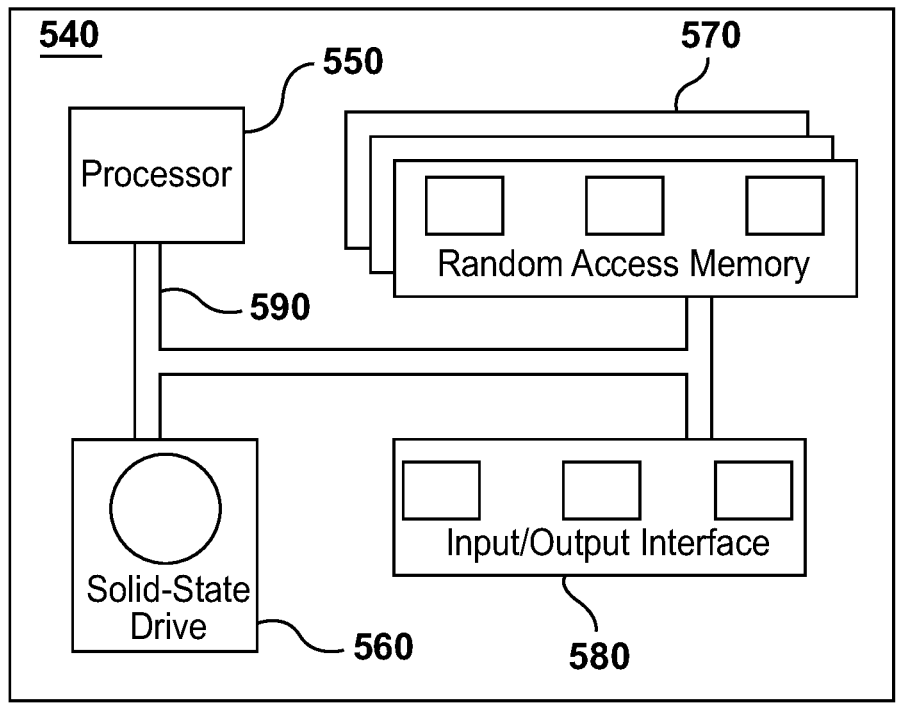
FIG. 5 depicts a schematic diagram of a computing environment of the system of FIG. 4, in accordance with certain embodiments of the present technology.

Referring to FIGS. 4 and 5, there is depicted a schematic diagram of a system 400 suitable for generating the augmented crown 3D representation associated with the given tooth of the subject such as for determining the orthodontic treatment for the subject, in accordance with certain non-limiting embodiments of the present technology.

It is to be expressly understood that the system 400 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the system 400 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 400 may provide in certain instances simple implementations of the present technology, and that where such is the case they have been presented in this manner as an aid to understanding. As persons skilled in the art would further understand, various implementations of the present technology may be of a greater complexity.

In certain non-limiting embodiments of the present technology, the system 400 of FIG. 4 comprises a computer system 410. The computer system 410 may be configured, by pre-stored program instructions, to generate, based on the image data associated with the subject, the boundary between the first crown portion 26 and the second crown portion 29, further used for generating the augmented first crown 3D representation of the first tooth 15. To that end, in some non-limiting embodiments of the present technology, the computer system 410 is configured to receive the image data pertaining to the subject or to a given orthodontic treatment. According to some non-limiting embodiments of the present technology, the computer system 410 may receive the image data via local input/output interface (such as USB, as an example, not separately depicted). In other non-limiting embodiments of the present technology, the computer system 410 may be configured to receive the image data over a communication network 425, to which the computer system 410 is communicatively coupled.

In some non-limiting embodiments of the present technology, the communication network 425 is the Internet and/or an Intranet. Multiple embodiments of the communication network may be envisioned and will become apparent to the person skilled in the art of the present technology. Further, how a communication link between the computer system 410 and the communication network 425 is implemented will depend, inter alia, on how the computer system 410 is implemented, and may include, but is not limited to, a wire-based communication link and a wireless communication link (such as a Wi-Fi communication network link, a 3G/4G communication network link, and the like).

It should be noted that the computer system 410 can be configured for receiving the image data from a vast range of devices. Some of such devices can be used for capturing and/or processing data pertaining to maxillofacial and/or cranial anatomy of the subject. In certain embodiments, the image data received from such devices is indicative of properties of anatomical structures of the subject, including: teeth, intraoral mucosa, maxilla, mandible, temporomandibular joint, and nerve pathways, among other structures. In some non-limiting embodiments of the present technology, at least some of the image data is indicative of properties of external portions of the anatomical structures, for example dimensions of a gingival sulcus, and dimensions of an external portion of a tooth (e.g., a crown of the tooth) extending outwardly of the gingival sulcus. In some embodiments, the image data is indicative of properties of internal portions of the anatomical structures, for example volumetric properties of bone surrounding an internal portion of the tooth (e.g., a root of the tooth) extending inwardly of the gingival sulcus. Under certain circumstances, such volumetric properties may be indicative of periodontal anomalies which may be factored into an orthodontic treatment plan. In some non-limiting embodiments of the present technology, the image data includes cephalometric image datasets. In some embodiments, the image data includes datasets generally intended for the practice of endodontics. In some embodiments, the image data includes datasets generally intended for the practice of periodontics.

In alternative non-limiting embodiments of the present technology, the computer system 410 may be configured to receive the image data associated with the subject directly from an imaging device 430 communicatively coupled thereto. Broadly speaking the imaging device 430 may be configured (for example, by a processor 550 depicted in FIG. 5) to capture and/or process the image data of the upper teeth 16 and the periodontium (not depicted) of the subject. In certain non-limiting embodiments of the present technology, the image data may include, for example, one or more of: (1) images of external surfaces of respective crown portions (such as the first crown portion 26 of the first tooth 15) of the upper teeth 16, (2) images of an external surface of the periodontium including those of the upper gingiva (not depicted), the alveolar maxillary bone (not depicted), and images of superficial blood vessels and nerve pathways associated with the upper teeth 16; and (3) images of an oral region. By doing so, the imaging device 430 may be configured, for example, to capture image data of the upper arch form 20 of the subject. In another example, the imaging device may also be configured to capture and/or process image data of a lower arch form (such as the lower arch form 21 depicted in FIG. 6) associated with the subject without departing from the scope of the present technology. It should be noted that the image data may include two-dimensional (2D) data and/or three-dimensional data (3D). Further, in certain non-limiting embodiments of the present technology, the image data includes 2D data, from which 3D data may be derived, and vice versa.

In some non-limiting embodiments of the present technology, the imaging device 430 may comprise an intraoral scanner enabling to capture direct optical impressions of the upper arch form 20 of the subject.

In a specific non-limiting example, the intraoral scanner can be of one of the types available from MEDIT, corp. of 23 Goryeodae-ro 22-gil, Seongbuk-gu, Seoul, South Korea. It should be expressly understood that the intraoral scanner can be implemented in any other suitable equipment.

In other non-limiting embodiments of the present technology, the imaging device 430 may comprise a desktop scanner enabling to digitize a mold representing the upper arch form 20. In this regard, the mold may have been obtained via dental impression using a material (such as a polymer, e.g. polyvinyl-siloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica.

In a specific non-limiting example, the desktop scanner can be of one of the types available from Dental Wings, Inc. of 2251, ave Letourneux, Montreal (QC), Canada, H1V 2N9. It should be expressly understood that the desktop scanner can be implemented in any other suitable equipment.

Further, it is contemplated that the computer system 410 may be configured for processing of the received image data. The resulting image data of the upper arch form 20 received by the computer system 410 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology. For implementing functions described above, the computer system 410 may further comprise a corresponding computing environment.

With reference to FIG. 5, there is depicted a schematic diagram of a computing environment 540 suitable for use with some implementations of the present technology. The computing environment 540 comprises various hardware components including one or more single or multi-core processors collectively represented by the processor 550, a solid-state drive 560, a random access memory 570, and an input/output interface 580. Communication between the various components of the computing environment 540 may be enabled by one or more internal and/or external buses 590 (e.g. a PCI bus, universal serial bus, IEEE 1394 "Firewire" bus, SCSI bus, Serial-ATA bus, ARINC bus, etc.), to which the various hardware components are electronically coupled.

The input/output interface 580 allows enabling networking capabilities such as wire or wireless access. As an example, the input/output interface 580 comprises a networking interface such as, but not limited to, a network port, a network socket, a network interface controller and the like. Multiple examples of how the networking interface may be implemented will become apparent to the person skilled in the art of the present technology. For example, but without being limiting, the input/output interface 580 may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 560 stores program instructions suitable for being loaded into the random access memory 570 and executed by the processor 550, according to certain aspects and embodiments of the present technology. For example, the program instructions may be part of a library or an application.

In some non-limiting embodiments of the present technology, the computing environment 540 is implemented in a generic computer system which is a conventional computer (i.e. an "off the shelf" generic computer system). The generic computer system may be a desktop computer/personal computer, but may also be any other type of electronic device such as, but not limited to, a laptop, a mobile device, a smart phone, a tablet device, or a server.

As persons skilled in the art of the present technology may appreciate, multiple variations as to how the computing environment 540 can be implemented may be envisioned without departing from the scope of the present technology.

Referring back to FIG. 4, the computer system 410 has at least one interface device 420 for providing an input or an output to a user of the system 400, the interface device 420 being in communication with the input/output interface 580. In the embodiment of FIG. 4, the interface device is a screen 422. In other non-limiting embodiments of the present technology, the interface device 420 may be a monitor, a speaker, a printer or any other device for providing an output in any form such as an image form, a written form, a printed form, a verbal form, a 3D model form, or the like.

In the depicted embodiments of FIG. 4, the interface device 420 also comprises a keyboard 424 and a mouse 426 for receiving input from the user of the system 400. Other interface devices 420 for providing an input to the computer system 410 can include, without limitation, a USB port, a microphone, a camera or the like.

The computer system 410 may be connected to other users, such as through their respective clinics, through a server (not depicted). The computer system 410 may also be connected to stock management or client software which could be updated with stock when the orthodontic treatment has been determined and/or schedule appointments or follow-ups with clients, for example.

Image Data

As previously alluded to, according to the non-limiting embodiments of the present technology, the processor 550 may be configured to: (1) receive the image data associated with the subject's teeth (such as the upper teeth 16); and (2) based on the received image data, determine, for each of the upper teeth 16, the orthodontic treatment for the subject. For example, based on the received data, the processor 550 may be configured to determine tooth movements of the first tooth 15 towards the aligned position thereof within the other ones of the upper teeth 16, as described above with reference to FIGS. 1 to 3.

According to some non-limiting embodiments of the present technology, having received the image data, the processor 550 may be configured to generate 3D models of arch forms of the subject.

Figure 6:
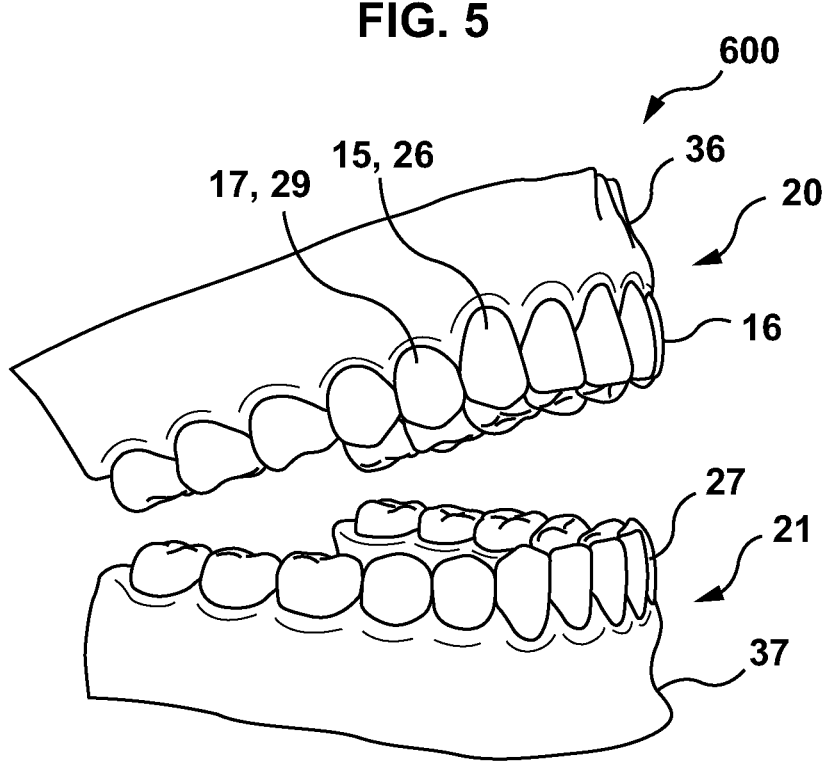
FIG. 6 depicts a perspective view of a 3D model of the upper arch form and a lower arch form of the subject of FIG. 1, in accordance with certain non-limiting embodiments of the present technology.

With reference to FIG. 6, there is depicted a perspective view of a 3D model 600 representing a current configuration of the upper arch form 20 (also referred to herein as "maxillary arch form") and the lower arch form 21 (also referred to herein as "mandibular arch form") of the subject, in accordance with the non-limiting embodiments of the present technology.

According to the non-limiting embodiments of the present technology, the upper arch form 20 comprises the upper teeth 16 (also referred to herein as "maxillary teeth") and the upper gingiva 36, and the lower arch form 21 comprises lower teeth 27 (also referred to herein as "mandibular teeth") and a lower gingiva 37. As it can be appreciated, the upper teeth 16 and the lower teeth 27 are represented, in the 3D model 600, by respective crown portions associated therewith, such as the first crown portion 26 of the first tooth 15 and the second crown portion 29 of the second tooth 17.

It should be expressly understood that, although the description herein below will be given in respect of the upper arch form 20 of the subject (and associated therewith the upper teeth 16 and the upper gingiva 36) for the sake of clarity and simplicity thereof, and in no way as a limitation, the non-limiting embodiments of the present technology can also apply to the lower teeth 27 with certain alterations, which will be explicitly indicated below where necessary.

Further, as will become apparent from the description provided below with reference to FIG. 7, in accordance with certain non-limiting embodiments of the present technology, the processor 550 may be configured to generate the 3D model 600 comprising a plurality of mesh elements representative of respective surfaces of each one of the upper arch form 20 and the lower arch form 21. In certain non-limiting embodiments of the present technology, the plurality of mesh elements may be represented, without limitation, by triangular mesh elements, quadrilateral mesh elements, convex polygonal mesh elements, or even concave polygonal mesh elements, as an example, without departing from the scope of the present technology.

Figure 9:
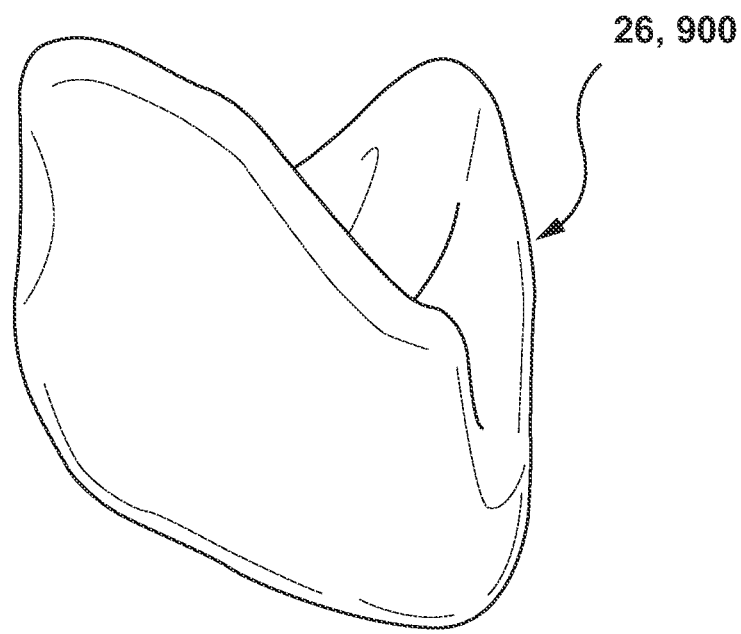
FIG. 9 depicts a schematic diagram of an augmented 3D representation of the one of the given pair of adjacent teeth having been segmented by the processor of FIG. 5 from the 3D model of FIG. 6 based on the boundary, for determining the orthodontic treatment, in accordance with certain non-limiting embodiment of the present technology.

Further, according to some non-limiting embodiments of the present technology, in order to determine the orthodontic treatment, the processor 550 may be configured to isolate, in the 3D model 600, the augmented first crown 3D representation of the first crown portion 26 (such as an augmented crown 3D representation 900 depicted in FIG. 9, for example) from crown 3D representations of crown portions associated with other ones of the upper teeth 16 adjacent to the first tooth 15, such as the second crown portion 29 of the second tooth 17, and from that of the upper gingiva 36. For example, the processor 550 may be further configured to reconstruct, based on the 3D representation of the first crown portion 26, a 3D representation of the first root portion 28, which may enable to generate a first tooth 3D representation of the first tooth 15.

However, the so generated 3D model 600 may not be accurately representative of actual configuration of at least some of the upper teeth 16. For example, the first crown portion 26 and the second crown portion 29 adjacent thereto, within the 3D model 600, may form a contact area therebetween, a so called "bridge", and/or a region of no contact therebetween, which is also referred to herein as a "tunnel". Thus, bridges and/or tunnels may impede accurate segmentation of the first crown 3D representation of the first crown 26.

In another example, the imaging device 430 of FIG. 4 may not be able to capture interdental spaces, such as a tunnel, between the first crown 26 and the second crown 29, for example, due to an inability thereof to reliably receive light having been reflected off the interdental spaces. This may result in the processor 550 generating the 3D model 600 including image artefacts (also known as "digital garbage", not separately depicted) instead of data indicative of actual interdental spaces between the teeth of the subject, which may further render the 3D model 600 unreliable for further processing.

In the context of the present specification, the term "image artefacts" of an image (such as the 3D model 600) representative of a real object (such as the upper arch form 20) broadly refers to portions of the image forming no part of the real object and generated, for example, due to imperfections of technical means (such as the imaging device 430) used for taking the image. As such, for a more accurate representation of the real object, the image artefacts need to be identified and removed from the image.

Thus, for devising a more accurate orthodontic treatment plan, bridges and/or tunnels between crown portions of adjacent teeth within the 3D model 600 should be effectively identified, and the image artefacts should be eliminated allowing for more accurate segmentation of the first crown 3D representation of the first crown portion from the 3D model 600. To that end, according to certain non-limiting embodiments of the present technology, the processor 550 may be configured to determine the plurality of interdental loops, based on which the processor 550 may be further configured to segment the first crown 3D representation of the first crown portion 26 in such a way that it does not include the image artefacts induced by the imaging device 430, which, in the context of the present specification, is referred to as an augmented first crown 3D representation. As it may be appreciated, failing to accurately identifying the tunnels and/or bridges within the 3D model 600 may result in the augmented first crown 3D representation being less accurately representative of actual boundaries of the first crown portion 26.

How the processor 550 can be configured to determine the plurality of interdental loops, in accordance with certain non-limiting embodiments of the present technology, will be described immediately below with reference to FIGS. 7 to 9.

Determining the Boundary Between Adjacent Teeth

Figure 7:
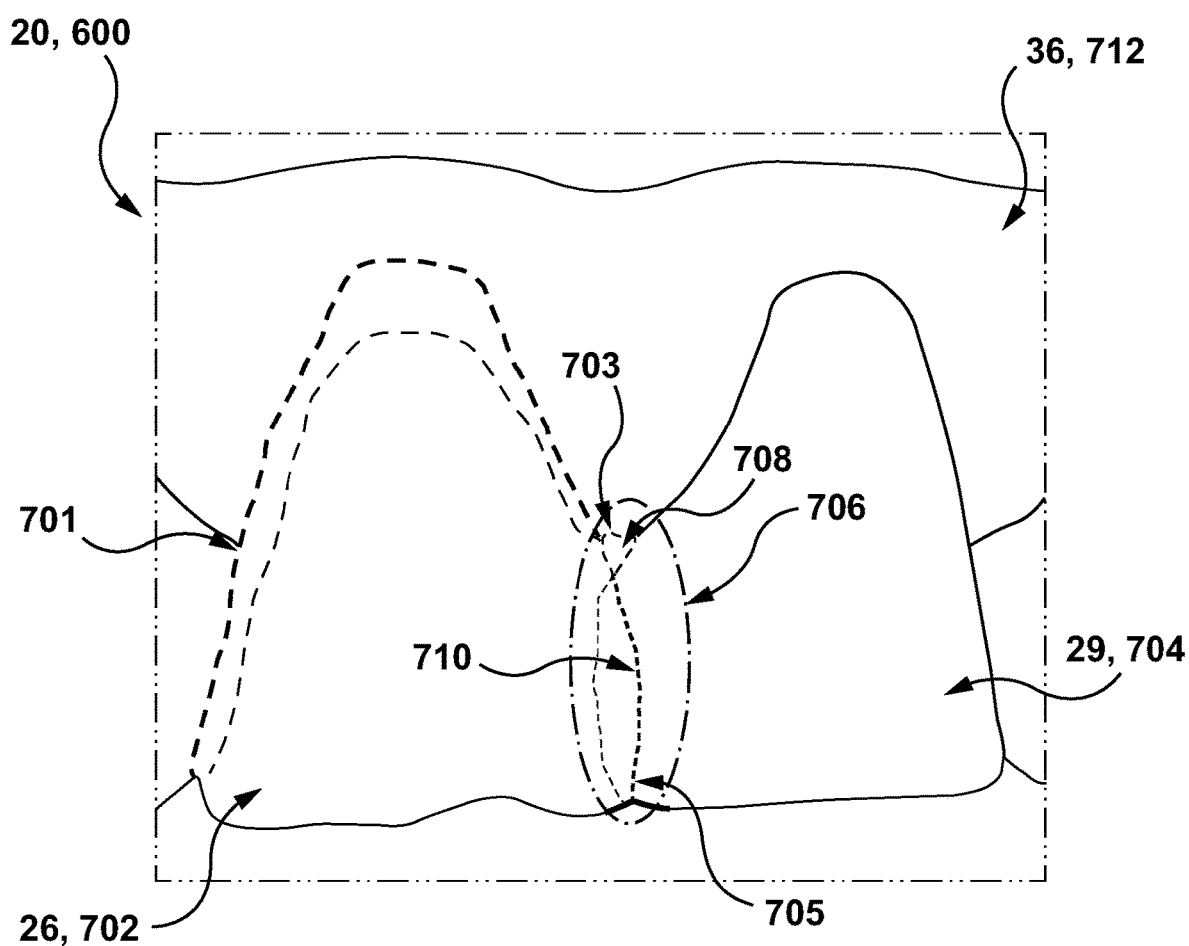
FIG. 7 depicts 3D representations of the given pair of adjacent teeth of the 3D model of FIG. 6 used, by a processor of FIG. 5, for determining a plurality of interdental loops therebetween, in accordance with certain non-limiting embodiments of the present technology.

With reference to FIG. 7, there is depicted a schematic diagram of a portion of the 3D model 600 providing a more detailed view of a first crown 3D representation 702 of the first crown portion 26 and a second crown 3D representation 704 of the second crown portion 29, in accordance with certain non-limiting embodiments of the present technology.

As it can be appreciated from FIG. 7, the first crown 3D representation 702 and the second crown 3D representation 704, when positioned within the 3D model 600, define an interdental region 706 therebetween. According to certain non-limiting embodiments of the present technology, the interdental region 706 includes at least two specific portions: (1) a tunnel portion 708 defined as an embrasure space between the first crown portion 26 and the second crown portion 29; and (2) a bridge portion 710 defined as a contact area between the first crown portion 26 and the second crown portion 29 associated with the upper arch form 20. In some non-liming embodiments of the present technology, the interdental region 706 may include the image artefacts (not depicted in FIG. 7) as described above.

It should be expressly understood that, in various non-limiting embodiments of the present technology, the first crown 3D representation 702 and the second crown 3D representation 704 may define, within the interdental region 706, one of: (1) only the tunnel portion 708; (2) only the bridge portion 710; and (3) both the tunnel portion 708 and the bridge portion. Thus, a given implementation of the methods described herein will depend on a particular configuration of the interdental region 706. For example, the configuration of the interdental region 706 may define a number of interdental loops in the plurality of interdental loops, as will be described below.

Thus, in order to segment the first crown 3D representation 702 from the 3D model 600, the processor 550 may be configured to determine the plurality of interdental loops including, at least one interdental loop indicative of one of the tunnel portion 708 and the bridge portion 710 of the interdental region 706. For example, the processor 550 may be configured to determine a first interdental loop 703 indicative of the tunnel portion 708 between the first crown 3D representation 702 and the second crown 3D representation 704. The first interdental loop 703 may be determined so as to outline the tunnel portion 708, thereby forming part of the boundary between the first crown portion 26 and the second crown portion 29.

Certain embodiments of the present technology are based on a premise that a given one of the plurality of interdental loops is determined based on a previously obtained tooth-gingiva segmentation loop segmenting the first crown 3D representation 702 from a gingiva 3D representation of the upper gingiva 36—such as a tooth-gingiva segmentation loop 701 depicted in FIG. 7. Further, as it can be appreciated, the tooth-gingiva segmentation loop 701 may define at least a partial boundary between the first crown 3D representation 702 and a third crown 3D representation (not depicted in FIG. 7) associated with an other adjacent tooth (not depicted in FIG. 7) to the tooth 15.

In some non-limiting embodiments of the present technology, the processor 550 may be configured to obtain the tooth-gingiva segmentation loop 701 having been previously generated by third-party software, based on the 3D model 600, and data indicative thereof may have been stored in a data format, in which the processor 550 may be configured to receive it, for example, via the input/output interface 580.

In other non-limiting embodiments of the present technology, the tooth-gingiva segmentation loop 701 may be generated manually, for example, by a practicing clinician involved in the determining the orthodontic treatment. For example, the practicing clinician may manually apply the tooth-gingiva segmentation loop 701 onto the 3D model 600, using respective suitable software, and the processor 550 may further be configured to receive the 3D model 600, and detect the tooth-gingiva segmentation loop 701 applied thereon.

In specific non-limiting embodiments of the present technology, the processor 550 may be configured to determine the tooth-gingiva segmentation loop 701 based on analyzing spatial curvature of the first crown 3D representation 702 and that of the gingiva 3D representation 712. More specifically, in this regard, the processor 550 may be configured to apply one of the approaches described in a co-owned U.S. Pat. No. 10,695,147-B1 issued on Jun. 30, 2020, entitled "METHOD AND SYSTEM FOR DENTAL BOUNDARY DETERMINATION", the content of which is hereby incorporated by reference in its entirety.

More specifically, according to certain non-limiting embodiments of the present technology, in order to determine the tooth-gingiva segmentation loop 701, the processor may be configured to: (i) receive the 3D model 600 of the upper arch form 20; (ii) define, around the first crown 3D representation 702, a given tooth-gingiva segmentation loop prototype around it of the tooth-gingiva segmentation loop 701; (iii) for each vertex of a plurality of vertices of the given tooth-gingiva segmentation loop prototype, determine an indication of curvature thereof; (iv) determine, based on the indication of curvature corresponding to the respective vertex, a predicted likelihood parameter for each vertex of the plurality of vertices, wherein the predicted likelihood parameter may indicate a predicted likelihood that a respective vertex corresponds to the tooth-gingiva segmentation loop 701 between the first crown portion 26 and the upper gingiva 36; and (v) use the predicted likelihood parameter of the respective vertices to select the vertices defining the tooth-gingiva segmentation loop 701.

Further, according to certain non-limiting embodiments of the present technology, the processor 550 may be configured to determine if all vertices associated with the first crown 3D representation 702 are positioned inside the tooth-gingiva segmentation loop 701. To that end, in some non-limiting embodiments of the present technology, the processor 550 may be configured to analyze curvature of a surface of the first crown 3D representation 702 relative to the gingiva 3D representation 712 and the second crown 3D representation 704 using techniques similar to those described in a co-owned U.S. patent application Ser. No. 16/937,312 allowed on Sep. 16, 2020, entitled "SYSTEMS AND METHODS FOR PLANNING AN ORTHODONTIC TREATMENT", the content of which is incorporated herein by reference in its entirety. In these embodiments, the processor 550 may further be configured to identify a first plurality of mesh elements (not separately labelled in FIG. 7) representative of the surface of the first crown 3D representation 702.

Thus, in certain non-limiting embodiments of the present technology, in response to determining that at least one vertex associated with the first crown 3D representation 702 is positioned outside the tooth-gingiva segmentation loop 701, the processor 550 may be configured to determine the first interdental loop 703.

Figure 8:
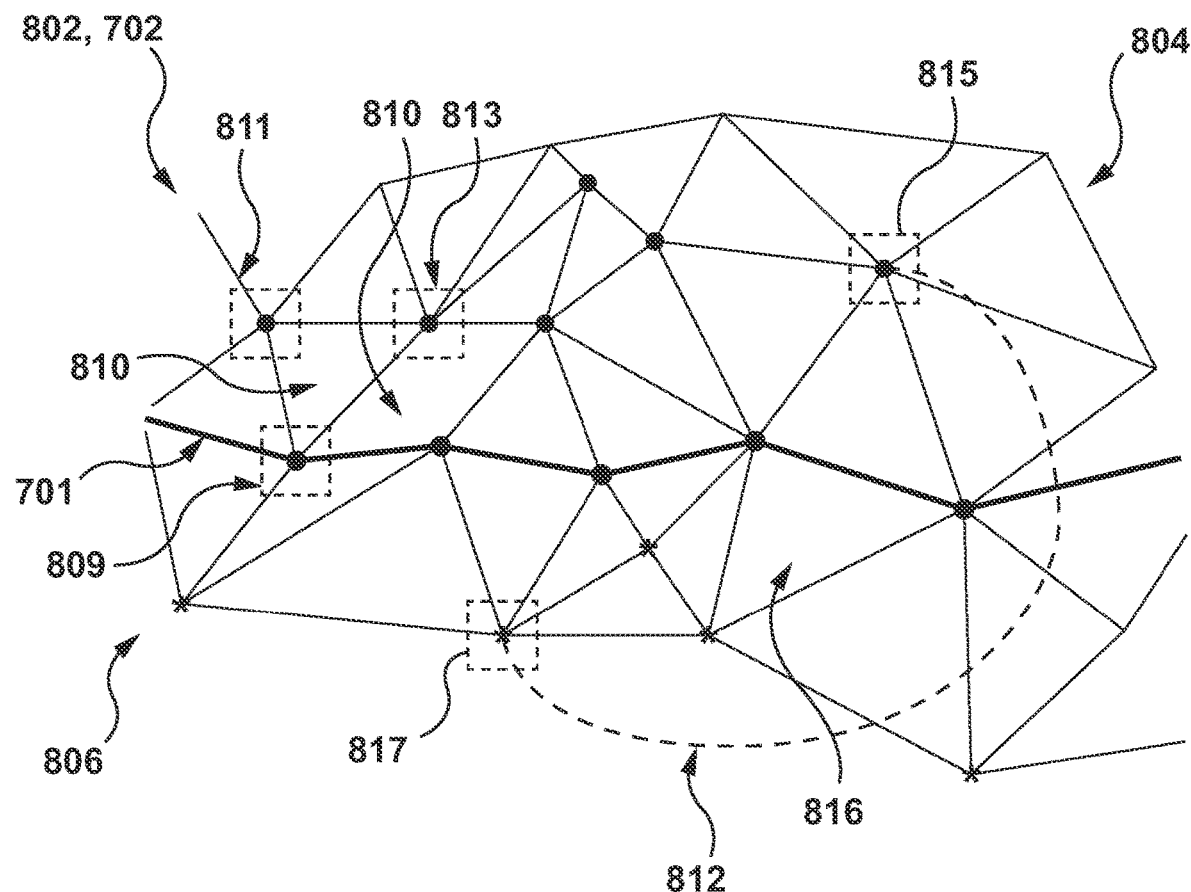
FIG. 8 depicts a schematic diagram of a magnified view of a 3D representation of one of the given pair of adjacent teeth illustrating a step for determining the given one of the plurality of interdental loops for determining the boundary between the given pair of adjacent teeth, in accordance with certain non-limiting embodiment of the present technology.

With reference to FIG. 8, there is depicted a magnified view of a first plurality of mesh elements 802 associated with the first crown 3D representation 702 illustrating a step of determining, by the processor 550, the first interdental loop 703 based on the tooth-gingiva segmentation loop 701, in accordance with certain non-limiting embodiments of the present technology.

According to certain non-limiting embodiments of the present technology, in response to determining that at least one vertex of the first set of vertices 802 is positioned outside the tooth-gingiva segmentation loop 701, the processor 550 may be configured to identify an outer set of vertices 804 and an inner set of vertices 806 positioned outside and inside relative to the tooth-gingiva segmentation loop 701, respectively. In some non-limiting embodiments of the present technology, the processor 550 may be configured to identify each one of the outer set of vertices 804 and the inner set of vertices 806 based on mesh elements, whose vertices define the tooth-gingiva segmentation loop 701.

Thus, for example, the processor 550 may be configured to identify a given mesh element 808 of the first plurality of mesh elements 802, in which a given vertex 809 thereof is part of the tooth-gingiva segmentation loop 701. Further, based on the given mesh element 808, the processor 550 may be configured to identify a first vertex 811 of the outer set of vertices 804 as an other given vertex of the given mesh element 808.

Further, according to certain non-limiting embodiments of the present technology, the processor 550 may be configured to identify, based on the given mesh element 808, other ones of the plurality of mesh elements whose vertices form each one of the outer set of vertices 804 and the inner set of vertices 806. To that end, in accordance with some non-limiting embodiments of the present technology, the processor 550 may be configured to apply certain conditions to identify such other ones of the first plurality of mesh element 802.

For example, the processor 550 may be configured to identify an other mesh element 810 satisfying the following conditions:
- at least one vertex of the other mesh element 810 forms part of the tooth-gingiva segmentation loop 701;
- the other mesh element 810 is representative of the first crown 3D representation 702;
- the other mesh element 810 has not yet been identified for determining the outer set of vertices 804; and
- the other mesh element 810 is adjacent to the given mesh element 810, based on which it is being identified.

Thus, the processor 550 may be configured to identify a second vertex 813 of the outer set of vertices 804. By so doing, the processor 550 may be configured to determine the outer set of vertices 804 representative of the first crown 3D representation 702. As it may become apparent, the processor 550 may be configured to determine the inner set of vertices 806 by identifying associated ones of the first plurality of mesh elements 802 by applying, mutatis mutandis, a similar approach as described above with respect to the outer set of vertices 804.

Certain non-limiting embodiments of the present technology are based on a premise that if the first interdental loop 703 exists, then there is a given path 812 within the interdental region 706 between the outer set of vertices 804 and the inner set of vertices 806, for example, between an outer given vertex 815 and an inner given vertex 817, not intersecting the tooth-gingiva segmentation loop 701. Thus, the processor 550 may be configured to determine the given path 812, based on which, in some non-limiting embodiments of the present technology, it may further be configured to determine the first interdental loop 703.

In some non-limiting embodiments of the present technology, the processor 550 can be configured to determine the given path 812 applying a shortest path algorithm. It is not limited as to which, specifically, shortest path algorithm the processor 550 is configured to apply to determine the given path 812; and in various non-limiting embodiments of the present technology, the shortest path algorithm may include, without limitation, at least one of: a Dijkstra's shortest path algorithm, a Bellman-Ford shortest path algorithm, a Floyd-Warshall shortest path algorithm, and a Johnson's shortest path algorithm, as an example.

Further, according to certain non-limiting embodiments of the present technology, the processor 550 can be configured to determine a closing segment 816 between the given outer vertex 815 and the given inner vertex 817 along the first plurality of mesh elements 802 associated with the first crown 3D representation 702. By doing so, the processor 550 is configured to close the given path 812, thereby determining the first interdental loop 703.

In some non-limiting embodiments of the present technology, the processor 550 may be configured to determine the closing segment 816 based on a shortest path between the given outer vertex 815 and the given inner vertex 817. In other non-limiting embodiments of the present technology, the processor 550 may be configured to determine the closing segment 816 such that a length thereof over the tooth-gingiva segmentation loop 701 is maximized.

Thus, in some non-limiting embodiments of the present technology, the processor 550 may be configured to determine the first interdental loop 703, indicative of the tunnel portion 708 defined between the first crown 3D representation 702 and the second crown 3D representation 704, intersecting the tooth-gingiva segmentation loop 701 only once. As it can be appreciated, the first interdental loop 703 may outline boundaries of the tunnel portion 708 from a buccal side associated with the upper arch form 20.

Further, in response to determining at least one vertex associated with the first plurality of mesh elements 802 outside of any one of the tooth-gingiva segmentation loop 701 and the first interdental loop 703 of the plurality of interdental loops, the processor 550 may be configured to determine, in a fashion similar to that described above, the second interdental loop 705 indicative of the bridge portion 710 of the interdental region 706 intersecting the first interdental loop 703. As depicted in FIG. 7, the second interdental loop 705 may be defined as a closed contour of a lingual-buccal cross-section of the bridge portion 710.

Thus, as it may be appreciated, the processor 550 may be configured to apply the approach described above in respect of the first interdental loop 703 to the first crown 3D representation 702 iteratively, mutatis mutandis, thereby expanding the plurality of interdental loops, until no vertex of the first plurality of mesh elements 802 is positioned outside of any one of the plurality of interdental loops. For example, by iteratively applying the approach described above, the processor 550 may be configured to determine those ones of the plurality of interdental loops, a totality of which further defines the tunnel portion 708 extending in the buccal-lingual direction associated with the upper arch form 20.

Hence, as it may be appreciated from the above, according to certain non-limiting embodiments of the present technology, the plurality of interdental loops may be generated in such a way that each next one of the plurality of interdental loops would intersect at least one of previously determined ones thereof. For example, a given next interdental loop may intersect that one of the plurality of interdental loops that has been generated immediately prior to generating the given next interdental loop, thereby forming a chain-like structure of the plurality of interdental loops outlining at least one of the tunnel portion 708 and the bridge portion 710.

According to certain non-limiting embodiments of the present technology, as mentioned above, the plurality of so determined interdental loops, in combination with the tooth-gingiva segmentation loop, may define the boundary between the first crown 3D representation 702, the second crown 3D representation 704, and the gingiva 3D representation 712. Thus, in these embodiments, based on the tooth-gingiva segmentation loop 701 and the plurality of interdental loops including at least the first interdental loop 703 and the second interdental loop 705, the processor 550 may be configured to segment the first crown 3D representation 702 from the second crown 3D representation 704 and the gingiva 3D representation 712.

Further, as it may be appreciated, in additional non-limiting embodiments of the present technology (not depicted), in a similar fashion, the processor 550 may be configured to segment the first crown 3D representation 702 from the third crown 3D representation (not depicted) associated with the other tooth (not depicted) adjacent to the tooth.

Thus, in some non-limiting embodiments of the present technology, based at least on the tooth-gingiva-segmentation loop and the plurality of interdental loops, the processor 550 may be configured to isolate the first crown 3D representation 702 from the 3D model 600, thereby generating the augmented first crown 3D representation 900 depicted in FIG. 9, in accordance with certain non-limiting embodiments of the present technology.

According to certain non-limiting embodiments of the present technology, the augmented first crown 3D representation 900 may be more closely indicative of the actual anatomical configuration of the first crown portion 26; and hence, the processor 550 may be further configured to store the augmented first crown 3D representation 900 in one of the solid-state drive 560 and the random access memory 570 for further use.

For example, as alluded to hereinabove, in some non-limiting embodiments of the present technology, the processor 550 may be configured to generate, based on the augmented first crown 3D representation 900, a more accurate first root 3D representation of the first root portion 28 used for generating the first tooth 3D representation of the first tooth 15. Consequently, the first tooth 3D representation may be used, by the processor 550, to model forces applied to the first tooth 15 in the course of the orthodontic treatment.

In specific non-limiting embodiments of the present technology, to determine the orthodontic treatment, the processor 550 may be configured to apply one or more approaches described in a co-owned U.S. patent application Ser. No. 17/014,107 filed on Sep. 8, 2020, and entitled "SYSTEMS AND METHODS FOR DETERMINING A TOOTH TRAJECTORY"; a content of which is hereby incorporated by reference in its entirety.

Method

Figure 10:
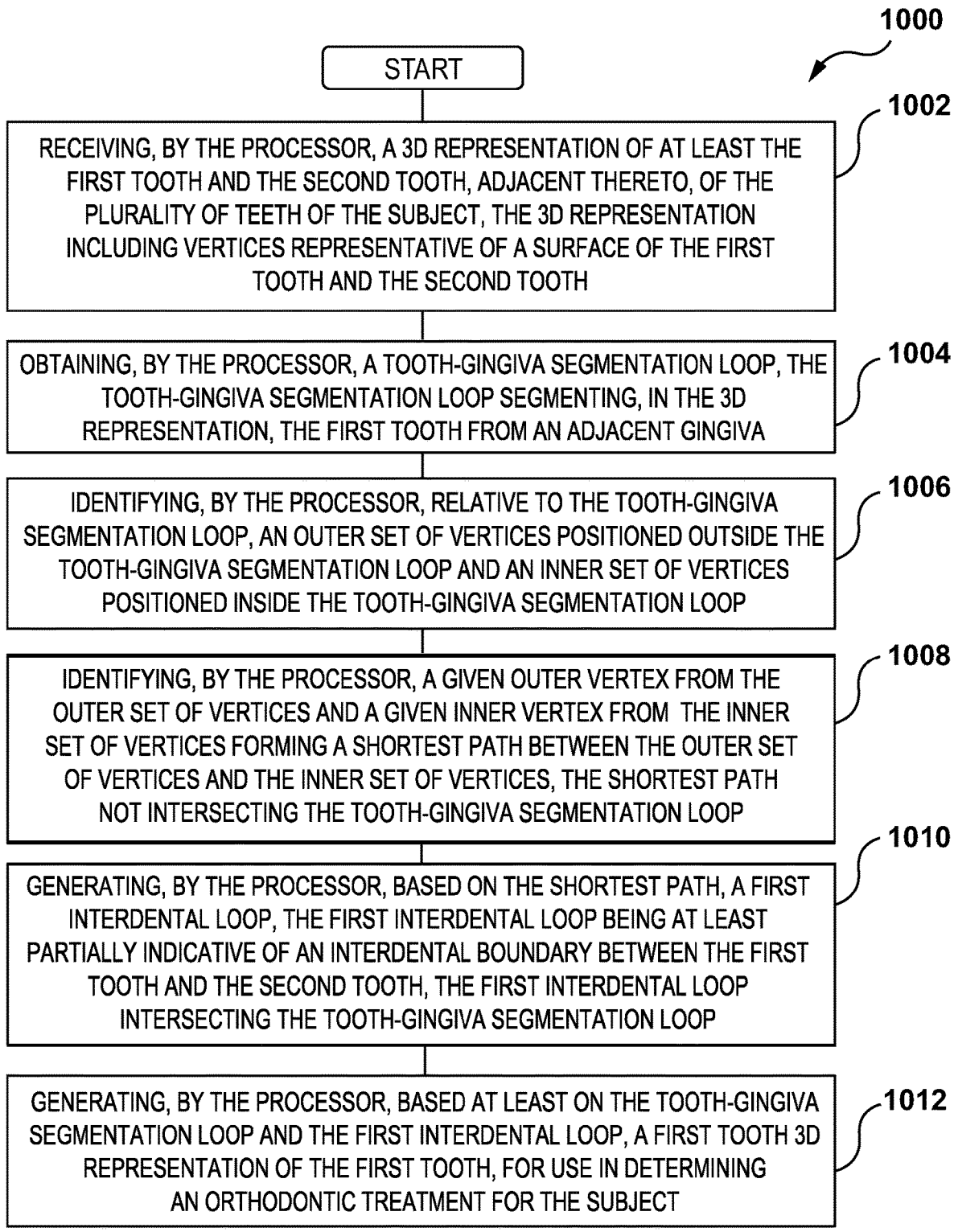
FIG. 10 depicts a flow-chart diagram of a method for determining, by the processor of FIG. 5, the boundary between the given pair of adjacent teeth, in accordance with certain non-limiting embodiment of present technology.

Given the architecture and the examples provided hereinabove, it is possible to execute a method for determining an orthodontic treatment for the subject based at least on determining a boundary between adjacent teeth thereof, such as the first tooth 15 and the second tooth 17, and more specifically, the first crown portion 26 and the second crown portion 29 respectively associated therewith. With reference now to FIG. 10, there is depicted a flowchart of a method 1000, according to certain non-limiting embodiments of the present technology. The method 1000 may be executed by the processor 550 of the system 400.

Step 1002: Receiving, by the Processor, a 3D Representation of at Least the First Tooth and the Second Tooth, Adjacent Thereto, of the Plurality of Teeth of the Subject, the 3D Representation Including Vertices Representative of a Surface of the First Tooth and the Second Tooth The method 1000 commences at step 1002 where the processor 550 can be configured to receive at least a 3D representation of the first crown portion 26 and the second crown portion 29.

To that end, as mentioned with reference to FIGS. 6 and 7, in some non-limiting embodiments of the present technology, the processor 550 may be configured to generate the 3D model 600 of the subject's arch forms including the first crown 3D representation 702 of the first crown portion 26 and the second crown 3D representation 704 of the second crown portion.

The method 1000 thus proceeds to step 1004.

Step 1004: Obtaining, by the Processor, a Tooth-Gingiva Segmentation Loop, the Tooth-Gingiva Segmentation Loop Segmenting, in the 3D Representation, the First Tooth from an Adjacent Gingiva At step 1004, according to certain non-limiting embodiments of the present technology, the processor 550 may be configured to obtain the tooth-gingiva segmentation loop 701 associated with the first crown 3D representation 702. The tooth-gingiva segmentation loop 701 may segment the first crown 3D representation 702 from the gingiva 3D representation 712 of the upper gingiva 36. As mentioned above, the processor 550 may be configured to use the tooth-gingiva segmentation loop 701 for further determining at least one of the plurality of interdental loops, for example, the first interdental loop 703, as will be described below.

As mentioned above, according to certain non-limiting embodiments of the present technology, the processor 550 may be configured to receive, via the input/output interface 580, the tooth-gingiva segmentation loop 701 that has preliminarily been generated by third-party software based on the 3D model 600, as an example.

In other non-limiting embodiments of the present technology, the processor 550 may be configured to determine the tooth-gingiva segmentation loop 701 based on analyzing the spatial curvature of the first crown portion 26 based on the first crown 3D representation 702 thereof.

More specifically, according to certain non-limiting embodiments of the present technology, in order to determine the tooth-gingiva segmentation loop 701, the processor may be configured to: (i) receive the 3D model 600 of the upper arch form 20; (ii) define, around the first crown 3D representation 702, a given tooth-gingiva segmentation loop prototype around it of the tooth-gingiva segmentation loop 701; (iii) for each vertex of a plurality of vertices of the given tooth-gingiva segmentation loop prototype, determine an indication of curvature thereof; (iv) determine, based on the indication of curvature corresponding to the respective vertex, a predicted likelihood parameter for each vertex of the plurality of vertices, wherein the predicted likelihood parameter may indicate a predicted likelihood that a respective vertex corresponds to the tooth-gingiva segmentation loop 701 between the first crown portion 26 and the upper gingiva 36; and (v) use the predicted likelihood parameter of the respective vertices to select the vertices defining the tooth-gingiva segmentation loop 701.

The method 1000 thus advances to step 1006.

Step 1006: Identifying, by the Processor, Relative to the Tooth-Gingiva Segmentation Loop, an Outer Set of Vertices Positioned Outside the Tooth-Gingiva Segmentation Loop and an Inner Set of Vertices Positioned Inside the Tooth-Gingiva Segmentation Loop At step 1006, as mentioned above with reference to FIG. 8, according to certain non-limiting embodiments of the present technology, the processor 550 may be configured to identify, within the first plurality of vertices 802 associated with the first crown 3D representation 702, the outer set of vertices 804 and the inner set of vertices 806 positioned outside and inside of the tooth-gingiva segmentation loop 701 to determine the first interdental loop 703.

For example, in some non-limiting embodiments of the present technology, the processor 550 may be configured to identify the outer set of vertices 804 and the inner set of vertices 806 in response to determining at least one vertex of the first plurality of vertices 802 positioned outside the tooth-gingiva segmentation loop 701, as described above with reference to FIGS. 7 and 8.

Further, as mentioned above with reference to FIG. 8, in some non-limiting embodiments of the present technology, the processor 550 may be configured to identify each one of the outer set of vertices 804 and the inner set of vertices 806 by analyzing mesh elements associated with the first plurality of vertices 802, whose vertices define the tooth-gingiva segmentation loop 701.

As mentioned above, the processor 550 may be configured to identify a given mesh element—such as the given mesh element 808, based on the following conditions:

at least one vertex of the given mesh element 808 forms part of the tooth-gingiva segmentation loop 701;

the given mesh element 808 is representative of the first crown 3D representation 702;

the given mesh element 808 has not yet been identified for determining the outer set of vertices 804; and the given mesh element 808 is adjacent to an other mesh element, such as the other mesh element 810, whose at least one vertex also forms part of the tooth-gingiva segmentation loop 701.

Thus, by so doing, the processor 550 may be configured to identify the first vertex 811 and the second vertex 813 of the outer set of vertices 804. According to certain non-limiting embodiments of the present technology, the processor 550 may be configured to identify the inner set of vertices 806 in a similar fashion.

The method 1000 hence advances to step 1008.

Step 1008: Identifying, by the Processor, a Given Outer Vertex from the Outer Set of Vertices and a Given Inner Vertex from the Inner Set of Vertices Forming a Shortest Path Between the Outer Set of Vertices and the Inner Set of Vertices, the Shortest Path not Intersecting the Tooth-Gingiva Segmentation Loop At step 1008, as mentioned above with reference to FIG. 8, the processor 550 may be configured to determine a shortest path between the outer set of vertices 804 and the inner set of vertices 806 forming part of the first interdental loop 703. To that end, for example, the processor 550 may be configured to determine the given path 812 between the given outer vertex 815 and the given inner vertex 817. As mentioned above, the processor 550 may be configured to determine the given path 812 such that it does not intersect the tooth-gingiva segmentation loop 701.

In some non-limiting embodiments of the present technology, to determine the given path 812, the processor 550 may be configured to apply one or more shortest path algorithms, such as a Dijkstra's shortest path algorithm, a Bellman-Ford shortest path algorithm, a Floyd-Warshall shortest path algorithm, and a Johnson's shortest path algorithm, as an example.

The method 1000 thus proceeds to step 1010.

Step 1010: Generating, by the Processor, Based on the Shortest Path, a First Interdental Loop, the First Interdental Loop being at Least Partially Indicative of an Interdental Boundary Between the First Tooth and the Second Tooth, the First Interdental Loop Intersecting the Tooth-Gingiva Segmentation Loop At step 1010, as described above with reference to FIG. 8, the processor 550 may be configured to determine, along the first plurality of vertices 802 associated with the first crown 3D representation 702, the closing segment 816 between the given outer vertex 815 and the given inner vertex 817, thereby determining the first interdental loop 703 intersecting the tooth-gingiva segmentation loop 701.

As described above, the first interdental loop 703 may be indicative of the tunnel portion 708 of the interdental region 706 defined between the first crown 3D representation 702 and the second crown 3D representation 704. In other words, as it may be appreciated from FIG. 7, the first interdental loop 703 may outline the tunnel portion 708 from a lateral side thereof.

The method 1000 thus advances to step 1012.

Step 1012: Generating, by the Processor, Based at Least on the Tooth-Gingiva Segmentation Loop and the First Interdental Loop, a First Tooth 3D Representation of the First Tooth At step 1012, according to certain non-limiting embodiments of the present technology, the processor 550 may be configured to segment the first crown 3D representation 702 from the second crown 3D representation 704 and the gingiva 3D representation 712 based on the tooth-gingiva segmentation loop 701 and the first interdental loop 703 of the plurality of interdental loops.

However, in additional non-limiting embodiments of the present technology, based on a particular configuration of the interdental region 706 between the first crown 3D representation 702 and the second crown 3D representation 704, the processor 550 may be further configured to determine other ones of the plurality of interdental loops.

For example, in response to determining that there is at least one vertex of the first plurality of vertices 802 associated with the first crown 3D representation 702 positioned outside any one of the tooth-gingiva segmentation loop 701 and the first interdental loop 703, the processor 550 may be configured to determine the second interdental loop 705 by applying, mutatis mutandis, steps 1006 to 1010 of the method 1000 to the first crown 3D representation 702, as described above. As it can be appreciated form FIG. 7, the second interdental loop 705 may be indicative of the bridge portion 710.

In yet other non-limiting embodiments of the present technology, the processor 550 may be configured to iteratively apply steps 1006 to 1010 to the first crown 3D representation 702, thereby identifying other ones of the plurality of interdental loops, until no vertex of the first plurality of vertices 802 is positioned outside any one of the tooth-gingiva segmentation loop 701 and the plurality of interdental loops.

Hence, as it may be appreciated from the above, according to certain non-limiting embodiments of the present technology, the plurality of interdental loops may be generated in such a way that each next one of the plurality of interdental loops would intersect at least one of previously determined ones thereof. For example, a given next interdental loop may intersect that one of the plurality of interdental loops that has been generated immediately prior to generating the given next interdental loop, thereby forming a chain-like structure of the plurality of interdental loops outlining at least one of the tunnel portion 708 and the bridge portion 710.

Further, the processor 550 may be configured to segment the first crown 3D representation 702 from the second crown 3D representation 704 and the gingiva 3D representation 712 based on the tooth-gingiva segmentation loop 701 and each one of the plurality of interdental loops.

As mentioned hereinabove, the processor 550, by applying steps 1006 to 1012 to another interdental region associated with the first crown 3D representation 702 may further be configured to determine a second plurality of interdental loops—between the first crown 3D representation 702 and the third crow 3D representation (not depicted) associated with the other tooth adjacent to the first tooth 15. Thus, in some non-limiting embodiments of the present technology, based on the tooth-gingiva segmentation loop 701, the plurality of interdental loops between the first crown 3D representation 702 and the second crown 3D representation 704, and the second plurality of interdental loops between the first crown 3D representation 702 and the third crown 3D representation (not depicted), the processor 550 may be configured to segment the first crown 3D representation 702 from the 3D model 600, thereby generating an augmented first crown 3D representation—such as the augmented first crown 3D representation 900 depicted in FIG. 9.

Further, the processor 550 may be configured to store the augmented first crown 3D representation 900 in one of the solid-state drive 560 and the random access memory 570 for further use. For example, as mentioned above with reference to FIG. 9, based on the augmented first crown 3D representation 900, the processor 550 may be configured to reconstruct the tooth 3D representation of the first tooth 3D representation of the first tooth 15, which may be used, for example, for modelling forces exerted by the orthodontic appliance 10 in the course of the planned orthodontic treatment.

Thus, certain embodiments of the method 1000 may allow generating, based on the plurality of interdental loops, the augmented first crown 3D representation 900, which is free of the image artefacts induced by conventional scanning techniques used in the field of orthodontics. Thus, a more predictable, accurate, and hence effective orthodontic treatment for the subject may be devised using the augmented first crown 3D representation 900.

The method 1000 thus terminates.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining an orthodontic treatment for a subject, the method being executable by a processor of an electronic device, the method comprising:

receiving, by the processor, a three-dimensional (3D) representation of at least the first tooth and the second tooth, adjacent thereto, of a plurality of teeth of the subject, the 3D representation including vertices representative of a surface of the first tooth and the second tooth;

obtaining, by the processor, a tooth-gingiva segmentation loop, the tooth-gingiva segmentation loop segmenting, in the 3D representation, the first tooth from an adjacent gingiva;

identifying, by the processor, relative to the tooth-gingiva segmentation loop, an outer set of vertices positioned outside the tooth-gingiva segmentation loop and an inner set of vertices positioned inside the tooth-gingiva segmentation loop;

identifying, by the processor, a given outer vertex from the outer set of vertices and a given inner vertex from the inner set of vertices forming a shortest path between the outer set of vertices and the inner set of vertices, the shortest path not intersecting the tooth-gingiva segmentation loop;

generating, by the processor, based on the shortest path, a first interdental loop, the first interdental loop being at least partially indicative of an interdental boundary between the first tooth and the second tooth, the first interdental loop intersecting the tooth-gingiva segmentation loop;

determining, by the processor, if there is at least one vertex of the 3D representation associated with the first tooth positioned outside any one of the tooth-gingiva segmentation loop and the first interdental loop; and in response to determining that no vertices of the 3D representation associated with the first tooth are positioned outside any one of the tooth-gingiva segmentation loop and the first interdental loop:

generating, by the processor, based at least on the tooth-gingiva segmentation loop and the first interdental loop, a first tooth 3D representation of the first tooth, for use in determining the orthodontic treatment for the subject.

2. The method of claim 1, further comprising:

in response to identifying at least one vertex of the 3D representation associated with the first tooth positioned outside any one of the tooth-gingiva segmentation loop and the first interdental loop:

determining, based on the at least one vertex, a second interdental loop intersecting the first interdental loop; and generating the first tooth 3D representation based on the tooth-gingiva segmentation loop, the first interdental loop, and the second interdental loop.

3. The method of claim 2, wherein the first interdental loop and the second interdental loop are ones of a plurality of interdental loops, and the method further comprises iteratively executing, until no vertices of the 3D representation associated with the first tooth are positioned outside any one of the tooth-gingiva segmentation loop and the plurality of interdental loops:

determining, based on at least one vertex of the 3D representation associated with the first tooth lying outside at least one of the plurality of interdental loops and the tooth-gingiva segmentation loop, a next interdental loop intersecting at least one of the plurality of interdental loops;

including the next interdental loop in the plurality of interdental loops; and generating the first tooth 3D representation based on the tooth-gingiva segmentation loop and the plurality of interdental loops.

4. The method of claim 1, further comprising determining, by the processor, based on the 3D representation, the tooth-gingiva segmentation loop, the determining comprising analyzing, by the processor, based on the 3D representation, a curvature of the first tooth.

5. The method of claim 1, wherein the identifying the outer set of vertices and the inner set of vertices is executed in response to at least one vertex of the 3D representation associated with the first tooth being positioned outside the tooth-gingiva segmentation loop, the method further comprising determining, by the processor, whether there is the at least one vertex associated with the first tooth 3D representation positioned outside the tooth-gingiva segmentation loop.

6. The method of claim 1, wherein the identifying the outer set of vertices and the inner set of vertices comprises identifying a given one of a plurality of mesh elements associated with one of the outer set of vertices and the inner set of vertices, such that:

the given one of the plurality of mesh elements is representative of the 3D representation;

the given one of the plurality of mesh elements has yet not been identified as being associated with the one of the outer set of vertices and the inner set of vertices;

the given one of the plurality mesh elements is adjacent to an other one of the plurality of mesh elements previously identified; and at least one vertex of the given one of the plurality of mesh elements is part of the tooth-gingiva segmentation loop.

7. The method of claim 1, wherein the identifying the given outer vertex and the given inner vertex includes applying a shortest path algorithm.

8. The method of claim 7, wherein the shortest path algorithm is a Dijkstra's shortest path algorithm.

9. The method of claim 1, further comprising causing display of the first tooth 3D representation of the first tooth.

10. The method of claim 9, further comprising determining the orthodontic treatment based on the first tooth 3D representation.

11. The method of claim 1, further comprising storing the first tooth 3D representation in a memory.

12. A system for determining an orthodontic treatment for a subject, the system comprising:

a processor;

a non-transitory computer-readable medium comprising instructions;

the processor, upon executing the instructions, being configured to:

receive a three-dimensional (3D) representation of at least a first tooth and a second tooth, adjacent thereto, of a plurality of teeth of the subject, the 3D representation including vertices representative of a surface of the first tooth and the second tooth;

obtain a tooth-gingiva segmentation loop, the tooth-gingiva segmentation loop segmenting, in the 3D representation, the first tooth from an adjacent gingiva;

identify relative to the tooth-gingiva segmentation loop, an outer set of vertices positioned outside the tooth-gingiva segmentation loop and an inner set of vertices positioned inside the tooth-gingiva segmentation loop;

identify a given outer vertex from the outer set of vertices and a given inner vertex from the inner set of vertices forming a shortest path between the outer set of vertices and the inner set of vertices, the shortest path not intersecting the tooth-gingiva segmentation loop;

generate, based on the shortest path, a first interdental loop, the first interdental loop being at least partially indicative of an interdental boundary between the first tooth and the second tooth, the first interdental loop intersecting the tooth-gingiva segmentation loop;

determine if there is at least one vertex of the 3D representation associated with the first tooth positioned outside any one of the tooth-gingiva segmentation loop and the first interdental loop; and in response to determining that no vertices of the 3D representation associated with the first tooth are positioned outside any one of the tooth-gingiva segmentation loop and the first interdental loop:

generate, based at least on the tooth-gingiva segmentation loop and the first interdental loop, a first tooth 3D representation loop of the first tooth.

13. The system of claim 12, wherein the processor is further configured to:

in response to identifying at least one vertex of the 3D representation associated with the first tooth positioned outside any one of the tooth-gingiva segmentation loop and the first interdental loop:

determine, based on at least one vertex, a second interdental loop intersecting the first interdental loop;

generate the first tooth 3D representation based on the tooth-gingiva segmentation loop, the first interdental loop, and the second interdental loop.

14. The system of claim 12, wherein to identify the given outer vertex and the given inner vertex, the processor is configured to apply a shortest path algorithm.

15. The system of claim 12, wherein the processor is further configured to determine, based on the 3D representation, the tooth-gingiva segmentation loop, the determining comprising analyzing a curvature of the first tooth.

16. The system of claim 12, wherein the processor is configured to identify the outer set of vertices and the inner set of vertices in response to at least one vertex of the 3D representation associated with the first tooth being positioned outside the tooth-gingiva segmentation loop, and the processor being further configured to determine whether there is the at least one vertex associated with the first tooth 3D representation positioned outside the tooth-gingiva segmentation loop.

17. The system of claim 12, wherein, in order to identify the outer set of vertices and the inner set of vertices, the processor is further configured to identify a given one of a plurality of mesh elements associated with one of the outer set of vertices and the inner set of vertices, such that:

the given one of the plurality of mesh elements is representative of the 3D representation;

the given one of the plurality of mesh elements has yet not been identified as being associated with the one of the outer set of vertices and the inner set of vertices;

the given one of the plurality mesh elements is adjacent to an other one of the plurality of mesh elements previously identified; and at least one vertex of the given one of the plurality of mesh elements is part of the tooth-gingiva segmentation loop.

18. The system of claim 12, wherein the first interdental loop and the second interdental loop are ones of a plurality of interdental loops, and the processor being further configured to iteratively execute, until no vertices of the 3D representation associated with the first tooth is positioned outside any one of the tooth-gingiva segmentation loop and the plurality of interdental loops:

determining, based on at least one vertex of the 3D representation associated with the first tooth lying outside at least one of the plurality of interdental loops and the tooth-gingiva segmentation loop, a next interdental loop intersecting at least one of the plurality of interdental loops;

including the next interdental loop in the plurality of interdental loops; and generating the first tooth 3D representation based on the tooth-gingiva segmentation loop and the plurality of interdental loops.

19. The system of claim 14, wherein the shortest path algorithm is a Dijkstra's shortest path algorithm.

20. The system of claim 12, wherein the processor is further configured to cause display of the first tooth 3D representation of the first tooth.

* * * * *